(12) United States Patent
Noro et al.

(10) Patent No.: US 6,252,551 B1
(45) Date of Patent: Jun. 26, 2001

(54) ANTENNA UNIT AND SIGNAL SWITCHING CIRCUIT

(75) Inventors: Junichi Noro; Nobuaki Monma; Hirokazu Awa; Nobuo Tamura; Takeshi Saito, all of Minamiakita-Gun (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/284,445

(22) PCT Filed: Aug. 12, 1998

(86) PCT No.: PCT/JP98/03600

§ 371 Date: Jun. 21, 1999

§ 102(e) Date: Jun. 21, 1999

(87) PCT Pub. No.: WO99/09610

PCT Pub. Date: Feb. 25, 1999

(30) Foreign Application Priority Data

| Aug. 13, 1997 | (JP) | .................................................. 9-218642 |
| Jun. 1, 1998 | (JP) | ................................................ 10-151591 |
| Jun. 2, 1998 | (JP) | ................................................ 10-153273 |
| Jun. 4, 1998 | (JP) | ................................................ 10-155671 |
| Jun. 5, 1998 | (JP) | ................................................ 10-158027 |

(51) Int. Cl.⁷ .................................................. H01Q 1/38
(52) U.S. Cl. ................................. 343/700 MS; 327/407; 327/408
(58) Field of Search ........................... 343/700 MS, 850, 343/853; 327/407, 408, 99, 299; 455/3.2, 25, 78

(56) References Cited

U.S. PATENT DOCUMENTS

| 5,048,118 | * | 9/1991 | Brooks et al. ......................... 455/156 |
| 5,404,581 | * | 4/1995 | Honjo ....................................... 455/90 |
| 5,880,695 | * | 3/1999 | Brown et al. ................. 343/700 MS |
| 5,933,115 | * | 8/1999 | Faraone et al. ............... 343/700 MS |
| 6,011,819 | * | 1/2000 | Shiro ..................................... 375/345 |

FOREIGN PATENT DOCUMENTS

| 61-206326 | 12/1986 | (JP) . |
| 4-159824 | 6/1992 | (JP) . |
| 4-234229 | 8/1992 | (JP) . |
| 5-18110 | 3/1993 | (JP) . |
| 06204905 | 7/1994 | (JP) . |
| 06291532 | 10/1994 | (JP) . |
| 07321544 | 8/1995 | (JP) . |
| 07273535 | 10/1995 | (JP) . |
| 07321549 | 12/1995 | (JP) . |
| 61-206326 | 9/1996 | (JP) . |

\* cited by examiner

*Primary Examiner*—Don Wong
*Assistant Examiner*—Trinh Vo Dinh
(74) *Attorney, Agent, or Firm*—Anderson, Kill & Olick P.C.

(57) ABSTRACT

To provide an antenna unit that can always provide good broadcast transmission reception and a signal switching circuit to be used therein. A first antenna element for receiving satellite broadcast transmissions, a second antenna element for receiving VHF terrestrial broadcast transmissions, and a switching means for selectively switching output of either a reception signal of the satellite broadcast transmissions received by the first antenna element or a reception signal of the VHF terrestrial broadcast transmissions received by the second antenna element and supplying that output to the receiver unit via the signal supply cable in response to a direct-current bias level supplied from a receiver unit via a signal supply cable are provided inside a single identical casing.

8 Claims, 21 Drawing Sheets

147 CHANGEOVER SWITCH

200 DAB RECEIVER SYSTEM

ANTENNA UNIT AND SIGNAL SWITCHING CIRCUIT

FIELD OF THE INVENTION

The present invention relates to antenna unit and signal switching circuit, and more particularly, an antenna unit and signal switching circuit for receiving a plurality of broadcast transmissions.

BACKGROUND OF THE INVENTION

In recent years, with the spread of the compact disk (CD), the superiority and ease of use of digital audio has come to be widely known. It is against this backdrop that the effort to digitalize radio broadcasts has gained momentum. Digital audio broadcasting (DAB) using either satellites or ground stations makes it possible to provide mobile listeners with a high-value-added service. As a result, planar antennae for receiving DAB transmissions which can be made compact and which can be easily mounted have come to be sought.

FIG. 1 is a block diagram of a conventional receiver system. The conventional receiver system shown in FIG. 1 chiefly comprises an antenna unit 2, a cable 3, a receiver unit 4, and amplifier 5 and a speaker 6.

The antenna unit 2, for example, includes a planar antenna and receives polarized radio waves from direction 1. The reception signals received at the antenna unit 2 are supplied to the receiver unit 4 via a cable 3.

The receiver unit 4 demodulates the reception signals supplied from the antenna unit 2 via the cable 3. The signals demodulated at the receiver unit 4 are supplied to the amplifier 5. The amplifier 5 amplifies the signals supplied from the receiver unit 4 and supplies these signals to the speaker 6. The speaker 6 outputs as audio the signals received at the antenna unit 2 and demodulated.

The above-described receiver system 1 only receives predetermined polarized waves, so reception is unstable. With mobile reception in particular, the planar antenna rotates as the signal moves, so without obtaining the necessary polarized waves good reception is difficult.

As a result, in order to maintain good mobile reception it is necessary to mount planar antennae to receive polarized waves from different directions and so selectively receive the polarized waves.

However, mounting a plurality of antenna units both increases the cost of the receiver system and complicates the installation and connection of the antenna unit.

In particular, mobile reception of DAB transmissions requires separate mounting of a left-handed polarized wave reception antenna unit 11 and a right-handed polarized wave reception antenna unit 12, thus making it difficult to make the mobile antenna compact and easy to mount.

Accordingly, there is a method of mounting multiple antenna elements on a single antenna unit. In this sort of configuration, typically, signals providing good reception are selected from among a plurality signals received by a plurality of antenna elements and supplied to the receiver unit. As a result, it is necessary to provide a signal switching circuit for selectively outputting to the antenna unit one signal from among the plurality of signals.

FIG. 2 is a block diagram of a conventional signal switching circuit. The signal switching circuit 10 selectively outputs according to a control signal either an input signal supplied to a first input terminal T1 or an input signal supplied to a second input terminal T2. To make this sort of signal switching circuit 10 a changeover switch 11 is used.

The changeover switch 11 comprises a signal pass-through type switching integrated circuit (IC). In the changeover switch 11, a first input terminal T1 is connected to input terminal Ta, a second input terminal T2 is connected input terminal Tb, an output terminal Tout is connected to output terminal Tc and a control terminal Tcont is connected to control terminal Td. The changeover switch 11 outputs to the output terminal Tout from the output terminal Tc one or the other of either a first input signal supplied to the input terminal Ta from the first input terminal T1 or a second input signal supplied to the input terminal Tb from the second input terminal T2 in response to a switching control signal supplied to the control terminal Td from the control terminal Tcont.

A brief description will now be given of the operation of the signal switching circuit 10.

FIG. 3 is a diagram for explaining the operation of a conventional signal switching circuit. In FIG. 3, (A) is a switching control signal supplied to the control terminal Tcont, (B) is a changeover switch 11 switching state and (C) is an output terminal Tout signal output state.

At a time t10, as indicated by (A) in FIG. 3, the control signal supplied to control terminal Tcont is at level LOW, input terminal Ta of the changeover switch 11 is connected to output terminal Tc and, as indicated by (C) in FIG. 3, a first input signal S1 input by the first input terminal T1 is supplied to the output terminal Tout.

Next, at a time t11, as indicated by (A) in FIG. 3, the control signal supplied to the control terminal Tcont is at a level HIGH, the input terminal Tb of the changeover switch 11 is connected to the output terminal Tc and, as indicated by (C) in FIG. 3, a second input signal S2 input by the second input terminal T2 is supplied to the output terminal Tout.

In order to transmit the output signal in the above-described signal switching circuit, in addition to the signal line a control line for supplying the control signal is necessary, thus complicating the wiring and increasing the cost.

Additionally, since input signal S1 is output via the changeover switch 11, signal loss is also experienced.

The present invention was conceived with the above-described points in mind, and has as its object to provide an antenna unit capable of receiving a plurality of different broadcast transmissions with a single antenna unit and a signal switching circuit that eliminates the need for a control signal line.

DISCLOSURE OF THE INVENTION

The present invention was conceived with the above-described points in mind, and has as its object to provide an antenna unit and signal switching circuit with simplified wiring and capable of reduced energy consumption.

The antenna unit of the present invention comprises:

a first antenna element for receiving either satellite transmissions or left-handed polarized waves; and a second antenna element for receiving either VHF terrestrial transmissions or right-handed polarized waves, wherein both the first and second antenna elements are provided within a single casing.

Additionally, the antenna unit of the present invention forms a first antenna element and a second antenna element on a single antenna element base.

Further, the antenna unit of the present invention is characterized in that the structure of the first antenna element as well as the structure of the second antenna element is that of a planar antenna.

Additionally, the antenna unit of the present invention comprises stacking means for stacking the satellite broadcast signal received by the first antenna element and the terrestrial broadcast signal received by the second antenna element.

Further, the antenna unit of the present invention comprises:
- a first low-noise amplifier circuit for amplifying a left-handed polarized wave to be received by the first antenna element;
- a second low-noise amplifier circuit for amplifying a right-handed polarized wave to be received by the second antenna element; and
- a switching circuit for selecting and outputting one of either the output signal from the first low-noise amplifier circuit or the output signal from the second low-noise amplifier circuit.

Additionally, the antenna unit of the present invention mounts the first low-noise amplifier circuit, the second low-noise amplifier circuit and the switching circuit on a single substrate.

Further, the antenna unit of the present invention mounts the first low-noise amplifier circuit, the second low-noise amplifier circuit and the switching circuit on a surface on a substrate and shields that surface so mounted with a shield casing, the first antenna element and the second antenna element being mounted on another surface of the substrate.

Additionally, in the antenna unit of the present invention the switching circuit comprises output voltage detecting means for detecting an output terminal voltage and power control means for controlling drive power for driving the first low-noise amplifier circuit and the second low-noise amplifier circuit according to the voltage detected by the output voltage detecting means.

Further, the antenna unit of the present invention detects the voltage of the output terminal and, based on the voltage detected, selectively outputs one of either the output signal of the first low-noise amplifier circuit or the output signal of the second low-noise amplifier circuit.

Further, the antenna unit of the present invention adjusts the drive voltage supplied to the first low-noise amplifier circuit and the second low-noise amplifier circuit from a first stabilized power circuit and a second stabilized power circuit according to the voltage of the output terminal and selectively outputs one of either the output signal of the first low-noise amplifier circuit or the output signal of the second low-noise amplifier circuit.

Additionally, the signal switching circuit of the present invention drives one of a plurality of signal amplifying means and selectively outputs one of a plurality of signals by supplying a voltage applied to an output terminal depending on the voltage detected at the output terminal as a drive voltage to one of a plurality of signal amplifying means.

Further, the signal switching circuit of the present invention can stabilize the operation of the signal amplifying means by supplying a stable drive voltage to be supplied to one of a plurality of signal amplifying means.

Additionally, another signal switching circuit of the present invention switches switching means according to the voltage detected at the output terminal and selectively connects to the output terminal one of a plurality of input terminals.

Additionally, another signal switching circuit of the present invention switches signal output by adjusting the supply to the amplifier circuit of drive voltage generated by a drive voltage generating means depending on a direct-current voltage level applied to the output terminal.

Further, the signal switching circuit of the present invention selectively outputs a signal by controlling the supply of drive voltage supplied to the signal amplifier circuit by controlling the operation of the drive voltage generating means that supply drive voltage to drive the signal amplifying means according to the direct-current voltage applied to the output terminal.

As described above, according to the antenna unit of the present invention, by combining the first antenna element and the second antenna element within a single casing, a single antenna unit can receive either left-handed polarized waves or right-handed polarized waves and the antenna unit itself is easily mountable.

Additionally, by giving both the first antenna element and the second antenna element a planar antenna structure it is possible to make the antenna unit compact and thus achieve the compactness and ease of installation sought in a planar antenna unit for mobile reception.

Further, by forming both the first antenna element and the second antenna element on the same antenna element substrate, the need to position the first antenna element and the second antenna element in separate casings is eliminated, thus simplifying manufacture and saving space.

Additionally, by having a first low-noise amplifier circuit for amplifying the left-handed polarized waves received by the first antenna unit, a second low-noise amplifier circuit for amplifying the right-handed polarized waves received by the second antenna unit and a switching circuit that selects and outputs one of either an output signal of the first low-noise amplifier circuit or an output signal of the second low-noise amplifier circuit, the present invention makes it possible to receive signals from both left-handed polarized waves and right-handed polarized waves with a single antenna unit, to switch output signals and to achieve the compactness and ease of installation sought in an antenna unit for mobile reception.

Further, by mounting the first low-noise amplifier circuit, the second low-noise amplifier circuit and the switching circuit on a single substrate, it is possible to simplify the structure and save space.

Additionally, by mounting the first low-noise amplifier circuit, the second low-noise amplifier circuit and the switching circuit on one surface of the substrate and shielding that surface so mounted with a shield casing, the circuitry can be electromagnetically shielded and the effects of noise can be reduced.

Additionally, according to the signal switching circuit of the present invention, by selectively switching the voltage applied to the output terminal as the drive voltage of a plurality of signal amplifying means it is possible to select one input terminal from a plurality of input terminals and to output from the output terminal, thus making it possible to switch signals by adjusting the output terminal bias voltage, thereby eliminating the need for specialized control wiring. Additionally, the need for a means for switching signal lines by controlling the operation of a plurality of signal amplifying means and switching the signal output is eliminated, thus eliminating signal loss.

Further, by selectively switching the voltage applied to the output terminal as the drive voltage of a plurality of signal amplifying means, the need for a means for switching signal lines by controlling the operation of a plurality of signal amplifying means and switching the signal output is eliminated, thus eliminating signal loss.

Additionally, by using a voltage converter means it is possible to set the drive voltage supplied to a plurality of amplifying means to a single predetermined voltage, thus making it possible to configure the plurality of signal amplifying means identically.

BEST MODE FOR ACHIEVING THE INVENTION

Figure 1:
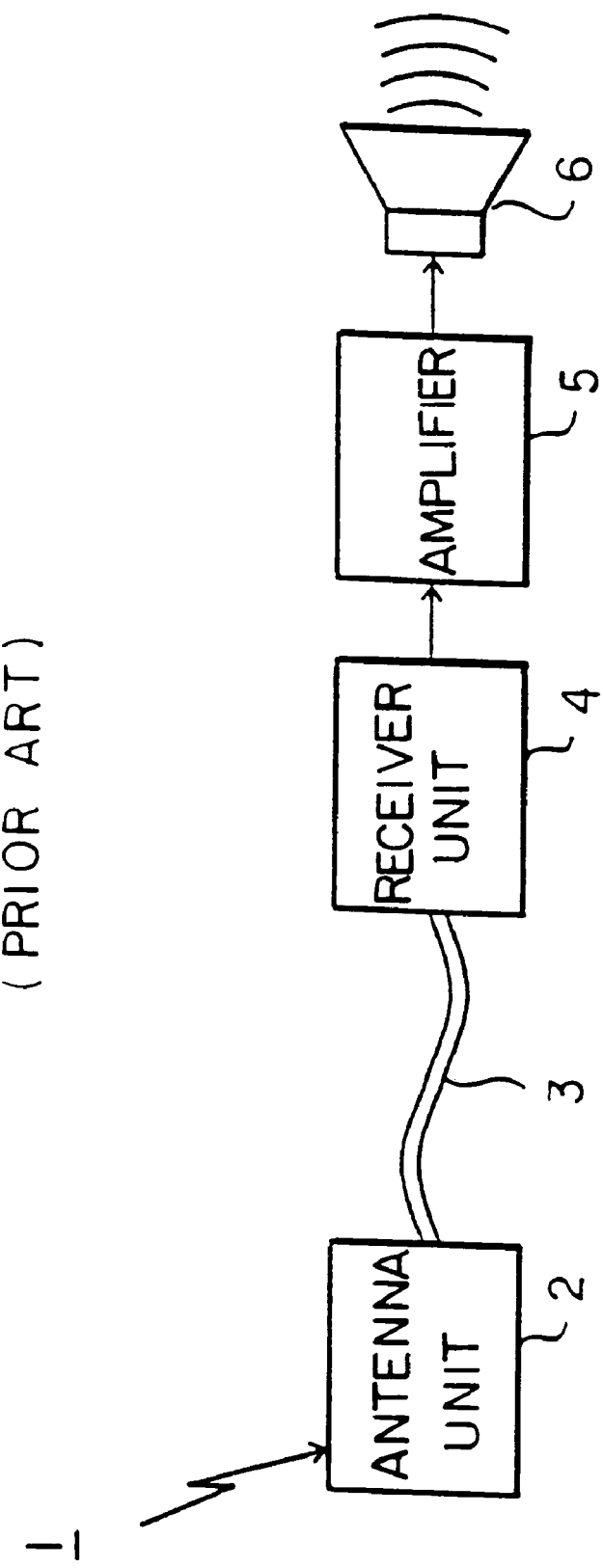
FIG. 1 is a block diagram of a conventional antenna unit.
Figure 2:
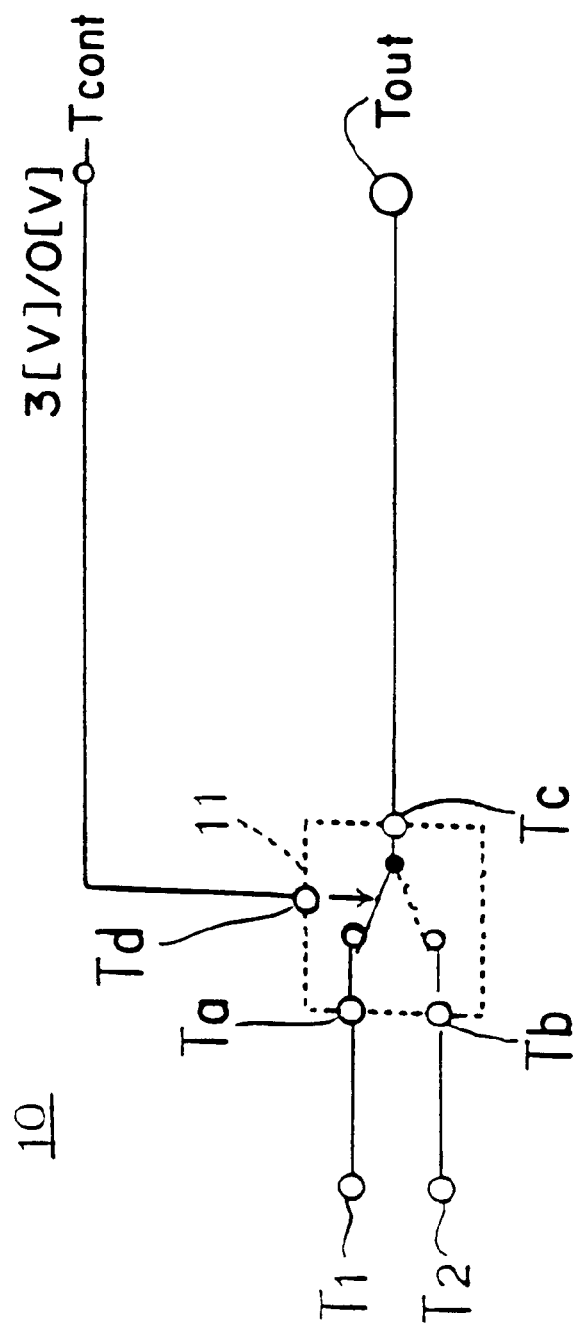
FIG. 2 is a block diagram of an antenna unit having a plurality of antenna elements.
Figure 3:
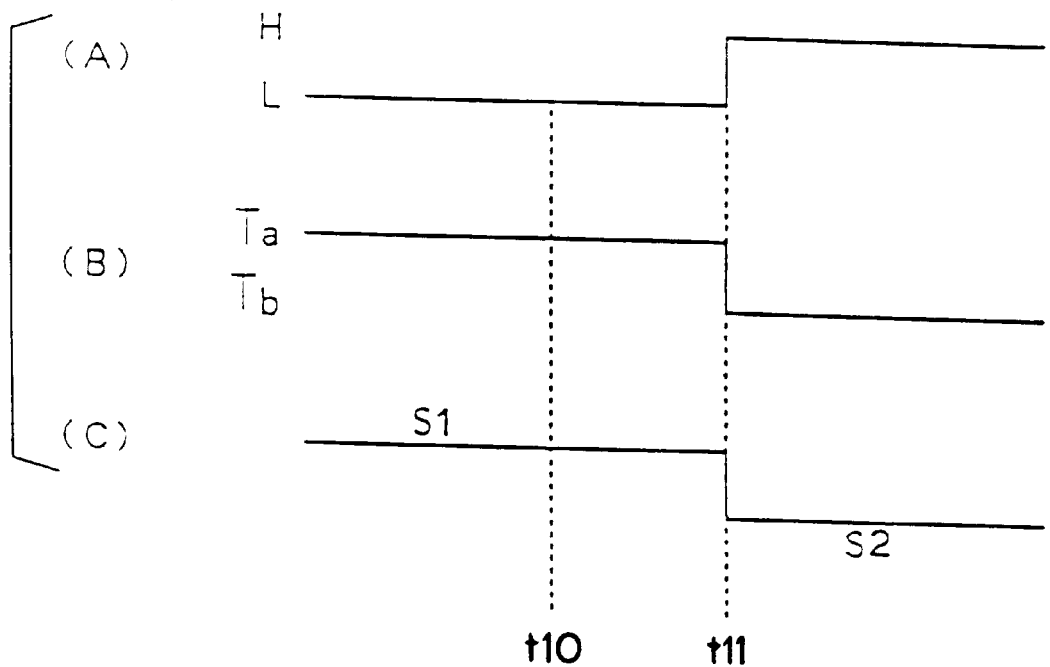
FIG. 3(A) shows a state of a switching control signal supplied to a control terminal.
FIG. 3(B) shows a switching state of a changeover switch.
FIG. 3(C) shows an output state of a signal of an output terminal.
Figure 4:
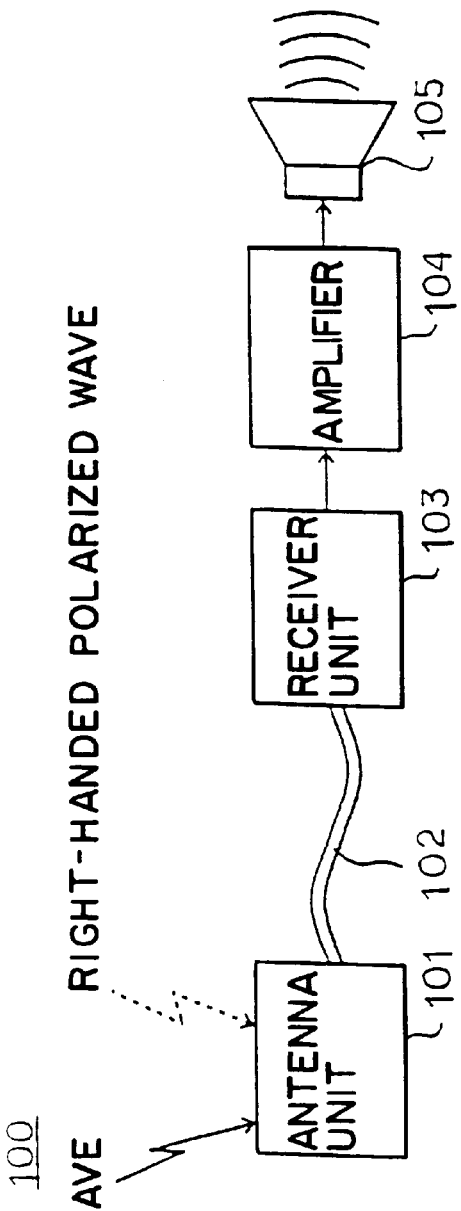
FIG. 4 is a schematic block diagram of a first embodiment of the present invention.

FIG. 4 is a block diagram of a first embodiment of the present invention.

A description will be given of a DAB (Digital Audio Broadcasting) receiver system 100 according to the present embodiment.

The DAB receiver system 100 comprises an antenna unit 101, a cable 102, a receiver unit 103, an amplifier 104 and a speaker 105.

The antenna unit 101 is connected to the receiver unit 103 via the cable 102. As will be described in detail below, two planar antennae are contained within the antenna unit 101, with the reception signal of one or the other planar antenna being selectively output depending on the bias voltage supplied from the receiver unit 103 via the cable 102. The receiver unit 103 demodulates the reception signal supplied from the antenna unit 101 into an analog audio signal and outputs it to the amplifier 104.

The amplifier 104 amplifies the reception signal and supplies it to a speaker 105. The speaker outputs audio in response to the analog audio signal supplied from the amplifier 104.

A description will now be given of the antenna unit 101.

Figure 5:
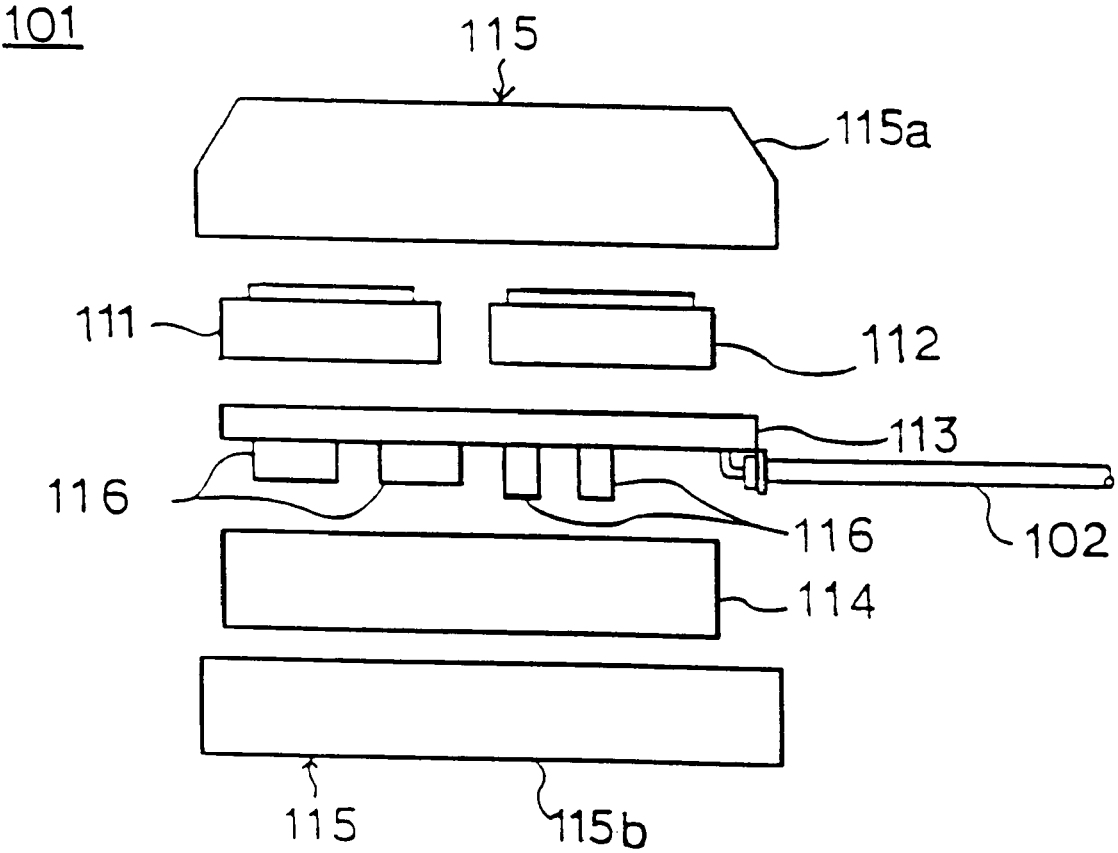
FIG. 5 is an exploded view of the antenna unit of a first embodiment of the present invention.

FIG. 5 is an exploded view of the antenna unit of a first embodiment of the present invention. The antenna unit 101 of the present embodiment comprises: planar antenna elements 111 and 112 for receiving satellite broadcasts; a circuit substrate 113 on which is mounted a circuit that amplifies and selectively outputs either the right-handed polarized wave signals of the satellite broadcast signals received at planar antenna element 111 or the left-handed polarized wave signals of the satellite broadcast signals received at planar antenna element 112; a shield casing 114 for shielding the circuit substrate 113; and a casing 115 for integratably housing the planar antenna elements 111, 112 and the circuit substrate 113. The circuit substrate 113 is connected to the receiver unit 103 via the cable 102.

Planar antenna 111 converts the right-handed polarized waves of the satellite broadcast transmission into electrical signals and supplies them to the signal substrate 113. Planar antenna 112 converts the left-handed polarized waves of the satellite broadcast transmission into electrical signals and supplies them to the signal substrate 113.

Electronic components 116 are mounted on a surface of the circuit substrate 113 opposite the surface on which are mounted the planar antenna elements 111, 112 and comprise the amplifier circuit and switching circuit to be discussed later.

The circuit formed on one surface of the circuit substrate 113 operates by high-frequency waves of the L wave band, so it is electromagnetically shielded by the shield casing 114 so as to not be affected by noise.

Figure 6:
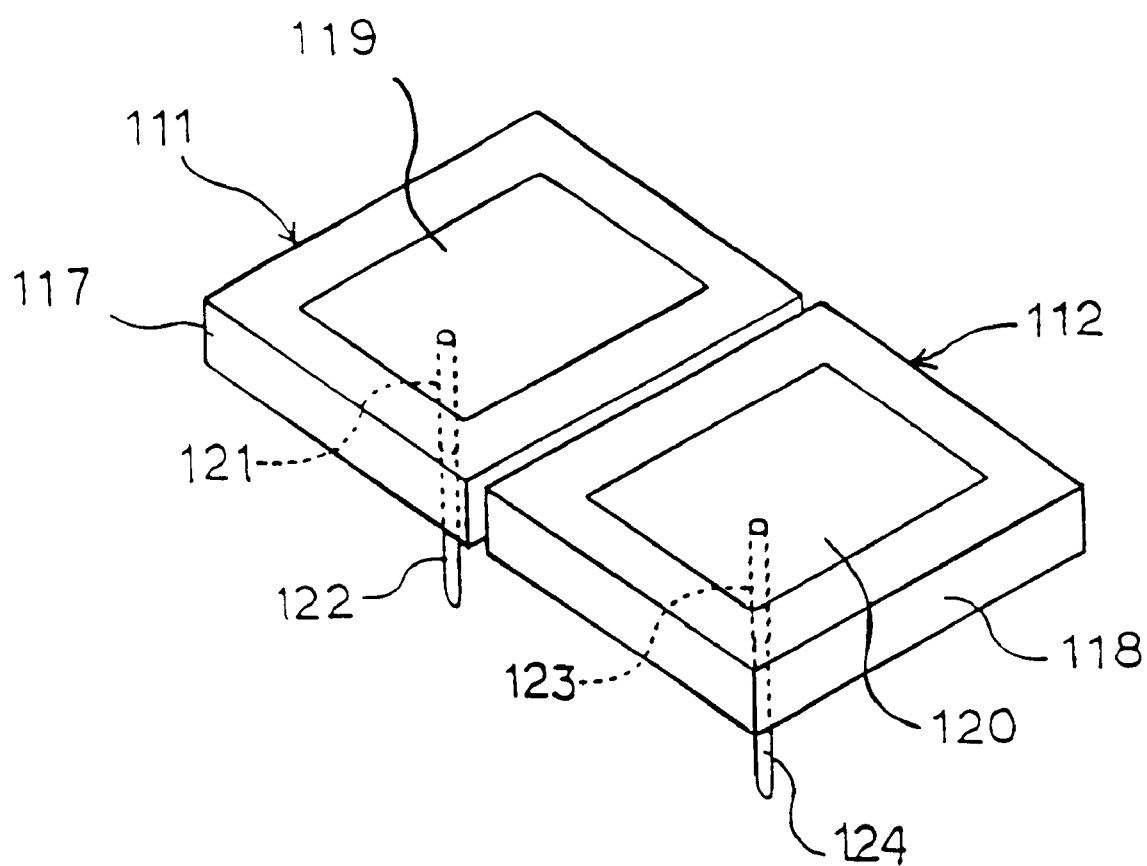
FIG. 6 is an oblique view of an antenna element of a first embodiment of the present invention.

FIG. 6 is an oblique view of the antenna elements of a first embodiment of the present invention. The planar antenna elements 111, 112 are made by forming conductive films 119, 120 made of a conducting material such as metal on one surface of dielectric substrates 117, 118 made of a dielectric material such as dielectric ceramics.

A through-hole aperture 121 is formed on the portion of the dielectric substrate 117 on which is formed the conductive film 119. A connecting pin 122 is inserted through the through-hole aperture 121. One end of the connecting pin 122 is soldered to the conductive film 119 and the other end of the connecting pin 122 is connected to the circuit substrate 113.

A through-hole aperture 123 is formed on the portion of the dielectric substrate 118 on which is formed the conductive film 120. A connecting pin 124 is inserted through the through-hole aperture 123. One end of the connecting pin 124 is soldered to the conductive film 120 and the other end of the connecting pin 122 is connected to the circuit substrate 113.

It should be noted that although the configuration shown in FIG. 6 has the planar antenna elements 111, 112 formed separately, they may be formed as a single unit as well.

Figure 7:
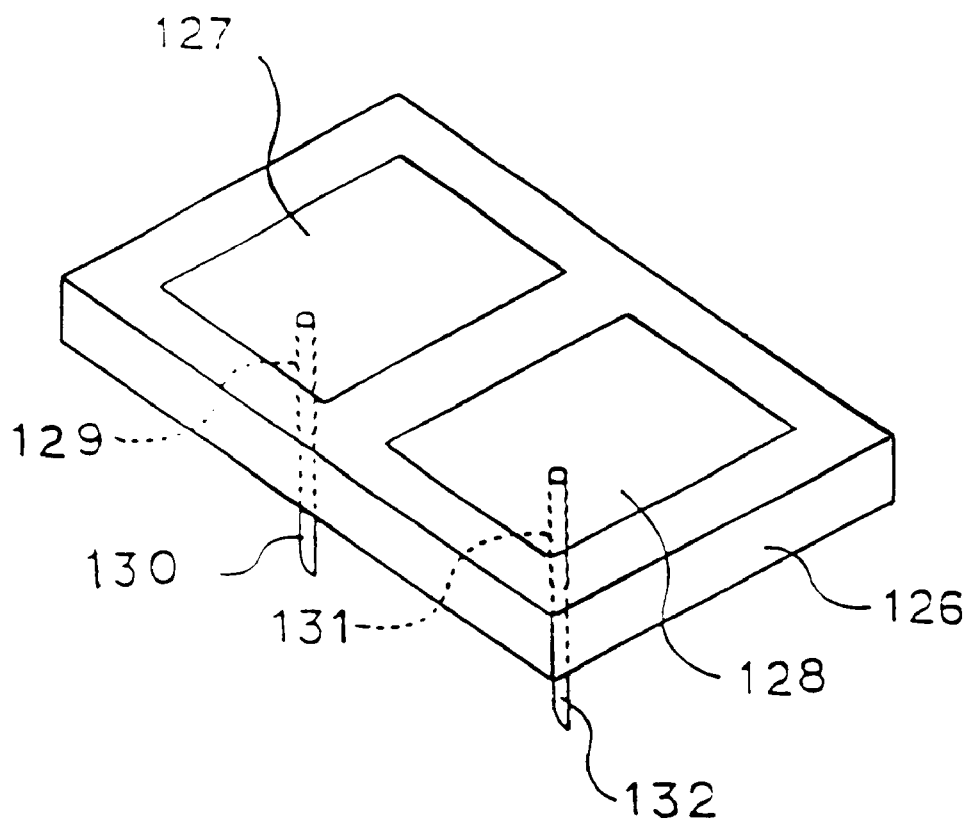
FIG. 7 is an oblique view of a variation of an antenna element of a first embodiment of the present invention.

FIG. 7 is an oblique view of a variation of the antenna element of a first embodiment of the present invention.

A plurality of antenna elements formed into a single planar antenna unit 125 is made by forming conductive films 127, 128 made of a conducting material such as metal on an identical surface of a dielectric substrate 126 made of a dielectric material such as dielectric ceramic. A through-hole aperture 129 is formed on the portion of the dielectric substrate 126 on which is formed the conductive film 127 and a connecting pin 130 is inserted through the through-hole aperture 129. One end of the connecting pin 130 is soldered to the conductive film 129 and the other end is connected to the circuit substrate 113.

A through-hole aperture 131 is formed on the portion of the dielectric substrate 126 on which is formed the conductive film 128 and a connecting pin 132 is inserted through the through-hole aperture 131. One end of the connecting pin 132 is soldered to the conductive film 128 and the other end is connected to the circuit substrate 113.

By configuring two patterns on a single planar antenna element in this manner both left- and right-handed polarized waves can be received by a single planar antenna unit 125.

The planar antenna unit 125 is connected to the circuit substrate 113 and amplification and signal switching are performed. Direct current power is supplied from the receiver unit 103 to the cable 102 and the individual circuits of the circuit substrate 113 are driven by direct current supplied from the receiver unit 103 via the cable 102. The planar antenna elements 111, 112, circuit substrate 113 and shield casing 114 are contained in a casing 115 composed of a top case 115a and a bottom case 115b.

A detailed description will now be given of the circuit substrate 113.

Figure 8:
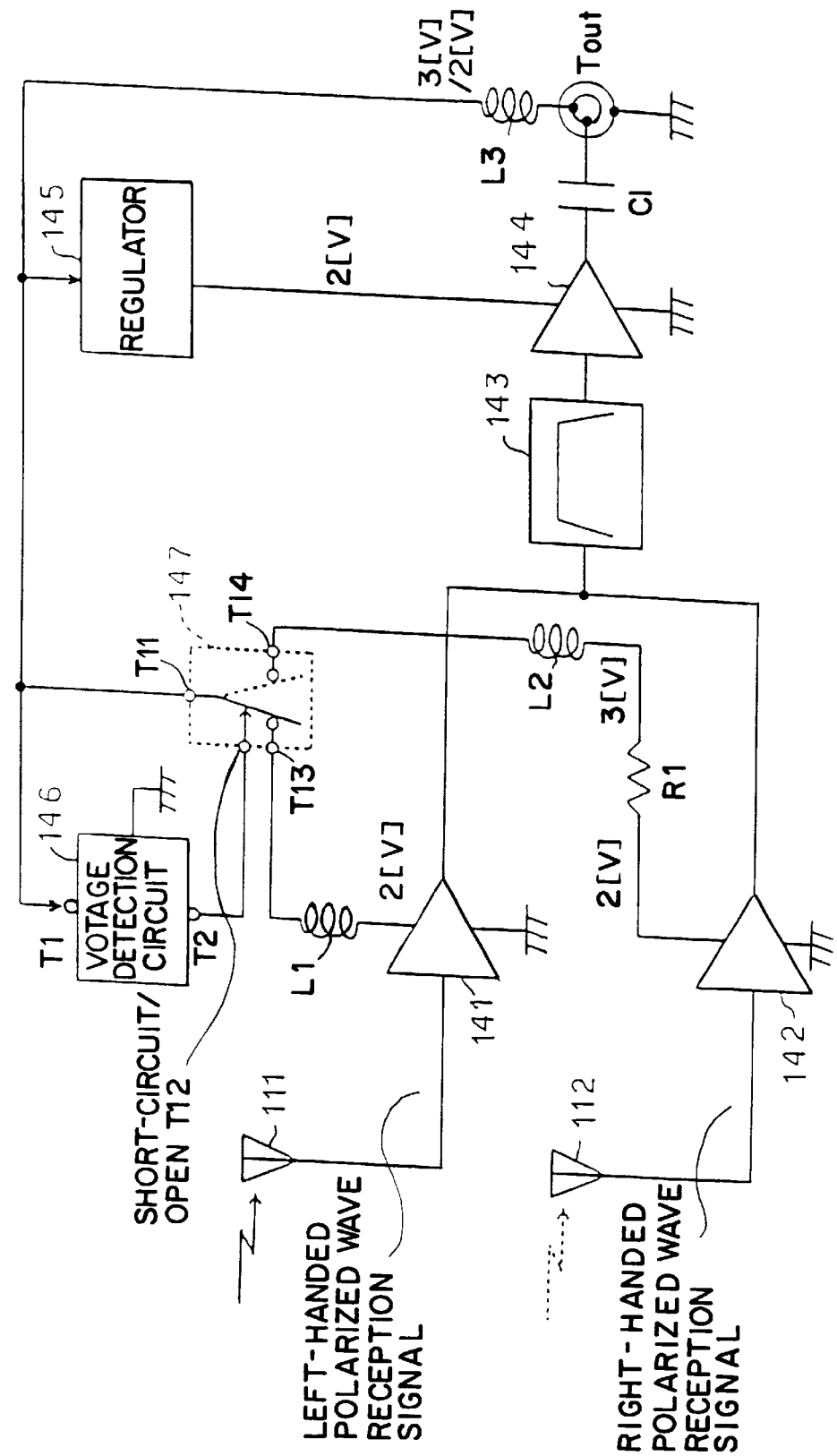
FIG. 8 is a block diagram of a circuit formed on a circuit substrate of an embodiment of the present invention.

FIG. 8 is a block diagram of a circuit formed on a circuit substrate of an embodiment of the present invention.

The circuit substrate 113 built into the antenna unit 101 comprises: a first amplifier circuit 141 that amplifies a signal received by the planar antenna element 111; a second amplifier circuit 142 that amplifies a signal received at the planar antenna element 112; a band-pass filter 143 that passes only essential components of the reception signal amplified by either the first amplifier circuit 141 or the second amplifier circuit 142; an amplifier circuit 144 that amplifies a signal passed by the band-pass filter 143; a condenser C1 for removing direct-current component provided between amplifier circuit 144 and output terminal Tout; a regulator circuit 145 that converts a bias voltage supplied to an output terminal Tout to a predetermined voltage; a voltage detection circuit 146 that detects a bias voltage supplied to an output terminal Tout and generates a high- or low-level control signal depending on the bias voltage; a changeover switch 147 that switches an output of the bias voltage supplied to the output terminal Tout between a drive voltage of the first amplifier circuit 141 and a drive voltage of a second amplifier circuit 142 in response to the control signal generated by the voltage detection circuit 146; a noise filter L1 that removes the signal component from the voltage selected by the changeover switch 147 as the drive voltage of the first amplifier circuit 141 and supplies the signal component to the first amplifier circuit 141; a noise filter L2 that removes the signal component from the voltage selected by the changeover switch 147 as the drive voltage of the second amplifier circuit 142; and a resistor R1 that drops the voltage from which the signal component has been removed by the noise filter L2 and supplies it to the second amplifier circuit 142.

A signal received at the planar antenna element 111 is supplied to the first amplifier circuit 141. The first amplifier circuit 141 comprises an LNA (Low-Noise Amplifier), and amplifies the signal supplied from the planar antenna element 111 and supplies it to the band-pass filter 143.

The voltage of the output terminal Tout is supplied to the first amplifier circuit 141 as a drive voltage via noise filter L1, changeover switch 147 and voltage detection circuit 146. When a predetermined drive voltage, that is, 2 [V], is applied, the first amplifier circuit 141 operates normally, amplifies signals supplied from the planar antenna element 111 and supplies them to the band-pass filter 143. Additionally, in a state in which drive voltage is not applied, the first amplifier circuit 141 terminates operation, and signals supplied from the planar antenna element 111 are cut off and not supplied to the band-pass filter 143.

A signal received at the planar antenna element 112 is supplied to the second amplifier circuit 142. The second amplifier circuit 142 comprises a LNA (Low-Noise Amplifier), and amplifies the signal supplied from the planar antenna element 112 and supplies it to the band-pass filter 143.

The voltage of the output terminal Tout is supplied to the second amplifier circuit 4 as a drive voltage via resistor RI, noise filter L2, changeover switch 147 and voltage detection circuit 146. When a predetermined drive voltage, that is, 2 [V], is applied, the second amplifier circuit 5 operates normally, amplifies signals supplied from the planar antenna element 112 and supplies them to the band-pass filter 143. Additionally, in a state in which drive voltage is not applied, the second amplifier circuit 142 terminates operation, and signals supplied from the planar antenna element 112 are cut off and not supplied to the band-pass filter 143.

The band-pass filter 143 takes one of either the reception signal output from the first amplifier circuit 141 or the reception signal output from the second amplifier circuit 142 and extracts the necessary band signal component. The band filter 143 output signal is supplied to the output amplifier circuit 144. The output amplifier circuit 144 amplifies the reception signal selected by the band-pass filter 143 and supplies it to the output terminal Tout from the condenser C1.

Direct-current bias voltage is applied to the output terminal Tout from a receiver unit to be discussed below. The direct-current bias voltage applied to the output terminal Tout is connected to the receiver unit to be discussed below by a cable connected to the output terminal Tout and, at the same time, is supplied to the regulator 145 and the voltage detection circuit 146. A direct-current bias of 2[V] or 3[V] is selectively applied to the output terminal Tout from the receiver unit 103 via the cable 102.

The output terminal Tout is connected to the regulator 145 via a filter L3. The filter L3 may for example be made by making the wiring pattern on the circuit substrate fine. The filter L3 removes the output terminal Tout signal component and supplies a direct-current bias of 2[V] or 3[V] to the regulator 145 and the voltage detection circuit 146.

The regulator 145 converts the 2[V] or 3[V] direct-current bias supplied from the output terminal Tout via the filter L3 into a 2[V] constant voltage and supplies it to the output amplifier circuit 144. The 2[V] constant voltage supplied to the output amplifier circuit 144 from the regulator 145 is used as the drive voltage for the output amplifier circuit 144. The output amplifier circuit 144 operates steadily on the 2[V] constant voltage supplied from the regulator 145.

Additionally, in the voltage detection circuit 146, the 2[V] or 3[V] direct-current bias supplied from the output terminal Tout via the filter L3 just as with the regulator 145 is supplied to a detection terminal T1. The voltage detection circuit 146 may, for example, be composed of a reset integrated circuit having an open collector output, and detects a direct-current bias voltage supplied to the detection terminal T1 and outputs either a HIGH- or LOW-level control signal from a control terminal T2.

If the direct-current bias voltage supplied to the detection terminal T1 is 2[V], then the voltage detection circuit 146 turns ON an output transistor and closes the control terminal T2. If the direct-current bias voltage supplied to the detection terminal T1 is 3[V], then the voltage detection circuit 146 turns the output transistor OFF and opens the control terminal T2. The control terminal T2 of the voltage detection circuit 146 is connected to the changeover switch 147.

The changeover switch 147 comprises a switch integrated circuit. An input terminal T11 is connected to the output terminal Tout and a control terminal T12 is connected to the control terminal T2 of the voltage detection circuit 9 and switches so that the input terminal T11 is connected to a first output terminal T13 when the control terminal T12 is closed and the input terminal T11 is connected to a second output terminal T14 when the control terminal T12 is open.

Figure 9:
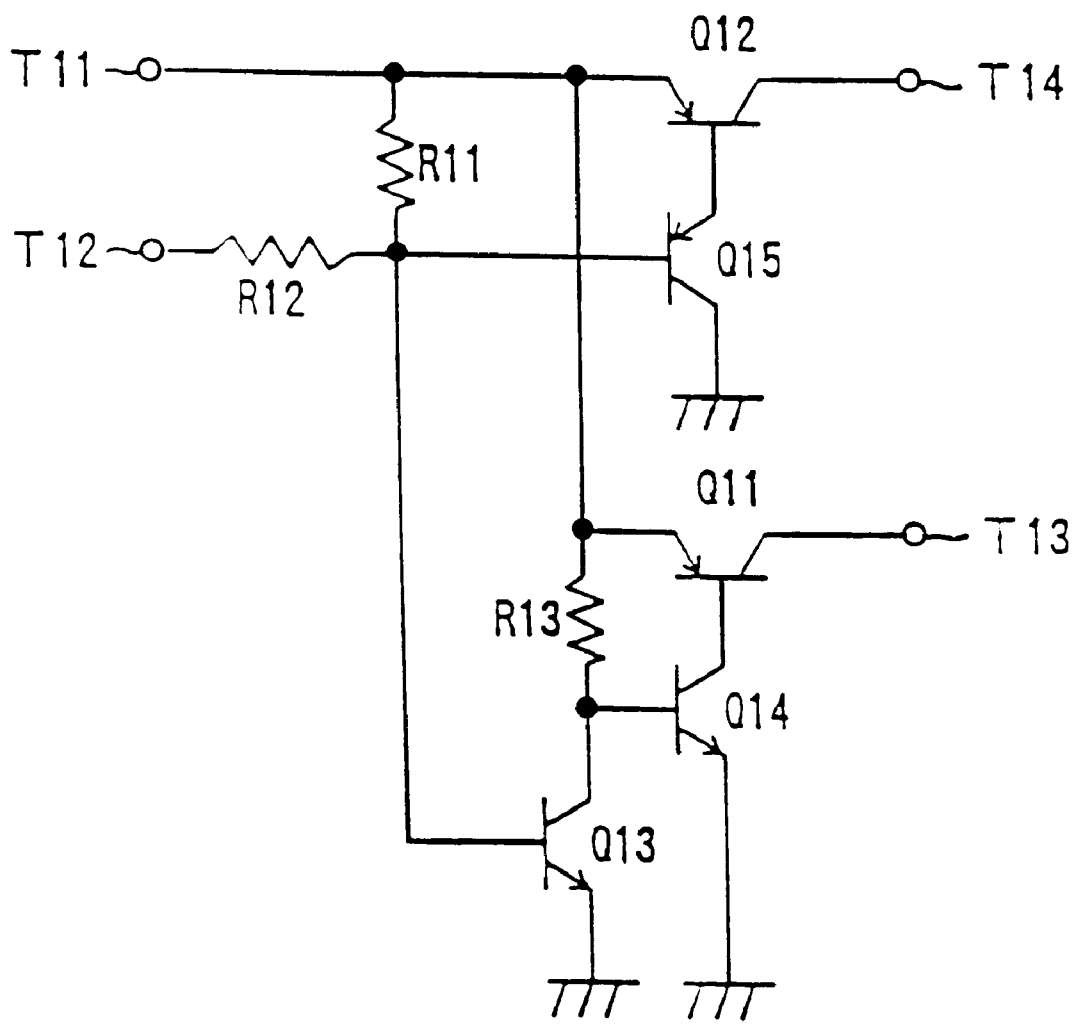
FIG. 9 is a diagram of a circuit structure of a changeover switch of a first embodiment of the present invention.

FIG. 9 is a diagram of a circuit structure of a changeover switch of a first embodiment of the present invention.

The change-over switch 147 of the present embodiment comprises resistors R11 to R13, PNP transistors Q11, Q12 and NPN transistors Q13 to Q15.

The input terminal T11 is connected to the output terminal Tout and a 2[V]/3[V] bias voltage is applied. The bias voltage applied to the input terminal T11 is supplied to the emitters of transistors Q11, Q12.

The collector of transistor Q11 is connected to terminal T13 and the collector of transistor Q12 is connected to terminal T14. By switching transistors Q11 and Q12 so that one is ON when the other is OFF, the bias voltage supplied to input terminal T11 is selectively output from either a first or a second output terminal T13 or T14.

The switching of transistor Q11 is controlled by transistor Q14. The collector of transistor Q14 is connected to the base of transistor Q11 and the emitter is grounded. The base phase of transistor Q11 is HIGH and the transistor is OFF when transistor Q14 is OFF, and the base phase of transistor Q11 is LOW and the transistor ON when transistor Q14 is ON.

The base of transistor Q14 is connected to the junction point between the resistor R13 and the collector of transistor Q13 and is controlled by the phase of the junction point between the resistor R13 and the collector of transistor Q13. The collector of transistor Q13 is connected to the input terminal T11 via the resistor R13, the emitter is grounded and the base is connected to the junction point between resistor R11 and resistor R12. Transistor Q13 is switched according to the phase of the junction point between resistor R11 and resistor R12, with the collector phase being either HIGH or LOW. Transistor Q14 is switched according to the phase of the collector of transistor Q13 and in turn switches transistor Q11.

The switching of transistor Q12 is controlled by transistor Q15. The collector of transistor Q15 is connected to the base of transistor Q12 and the emitter is grounded. The base phase of transistor Q12 is HIGH and the transistor is OFF when transistor Q15 is OFF, and the base phase of transistor Q12 is LOW and the transistor ON when transistor Q15 is ON.

The base of transistor Q15 is connected to the junction point between resistor R11 and resistor R12 and is switched according to the phase of the junction point between resistor R11 and resistor R12, switching transistor Q12.

One end of resistor R11 is connected to the input terminal T11 and the other end is connected to one end of the resistor R12. One end of resistor R12 is connected to the other end of resistor R11 and the other end of resistor R12 is connected to the control terminal T12.

It should be noted that the control terminal T12 is connected to the control terminal T2 of the voltage detection circuit 146. Control terminal T2 of the voltage detection circuit 146 is open collector output. When the output terminal Tout bias voltage is 2 [V], the voltage detection circuit 146 turns the output transistor ON and grounds it, thereby grounding the control terminal T2. When the output terminal Tout bias voltage is 3 [V], the voltage detection circuit 146 turns the output transistor OFF and opens the transistor.

As a result, when the output terminal Tout bias voltage is 2[V], the control terminal T12 of the changeover switch 10 is grounded and the phase of the junction point between resistor R11 and resistor R12 becomes LOW, turning transistor Q12 ON.

By contrast, when the phase of the junction point between resistor R11 and resistor R12 is LOW, transistor Q15 turns OFF and the base phase of transistor Q12 rises, turning transistor Q12 OFF.

When control transistor T12 is LOW as described above, the phase of the junction point between resistor R11 and resistor R12 becomes LOW, transistor Q11 turns ON, transistor Q12 turns OFF and input terminal T11 is connected to the first output terminal T13.

Additionally, when the output terminal Tout bias voltage is 3[V], the output transistor turns OFF and is opened, thereby opening the control terminal T2.

As a result, the control terminal T12 of the changeover switch 146 is also opened and the phase of the junction point between resistor R11 and resistor R12 becomes HIGH.

When the phase of the junction point between resistor R11 and resistor R12 becomes HIGH transistor Q13 turns ON, causing the base phase of transistor Q14 to drop and transistor Q14 to turn OFF. When transistor Q14 turns OFF the base phase of transistor Q11 becomes HIGH and transistor Q11 turns OFF.

By contrast, when the phase of the junction point between R11 and R12 becomes HIGH transistor Q15 turns ON, causing the base phase of transistor Q12 to drop and turning transistor Q12 ON.

When control terminal T12 is HIGH as described above, the phase of the junction point between resistor R11 and resistor R12 becomes HIGH, transistor Q11 turns OFF, transistor Q12 turns ON and input terminal T11 is connected to the second output terminal T14.

The first output terminal T13 of the changeover switch 147 is connected to the line terminal of the first amplifier circuit 141 via the noise filter L1.

The noise filter L1 removes the noise component from the direct-current bias voltage. A 2 [V] direct-current bias voltage from which the noise component has been removed by the noise filter L1 is supplied to the first amplifier circuit 141 as a drive voltage. The first amplifier circuit 141 is driven by the 2 [V] direct-current bias voltage, amplifies the signal received at the planar antenna element 111 and supplies it to the band-pass filter 143.

Additionally, the second output terminal T14 of the changeover switch 147 is connected to the line terminal of the second amplifier circuit 142 via a noise filter L2 and resistor R1.

Noise filter L2 removes the noise component from the direct-current bias voltage. A 3 [V] direct-current bias voltage from which the noise component has been removed by the noise filter L2 is supplied to the resistor R1. A voltage of 1 [V] is at the resistor R1, which reduces the 3 [V] direct-current bias voltage to 2 [V] and supplies it to the second amplifier circuit 142.

The direct-current bias voltage from which the noise component has been removed by the noise filter L2 and the voltage reduced by the resistor R1 is supplied to the second amplifier circuit 142 as the drive voltage. The second amplifier circuit 142 is driven by the 2 [V] direct-current bias voltage, amplifies the signal received at the planar antenna element 112 and supplies it to the band-pass filter 143.

Figure 10:
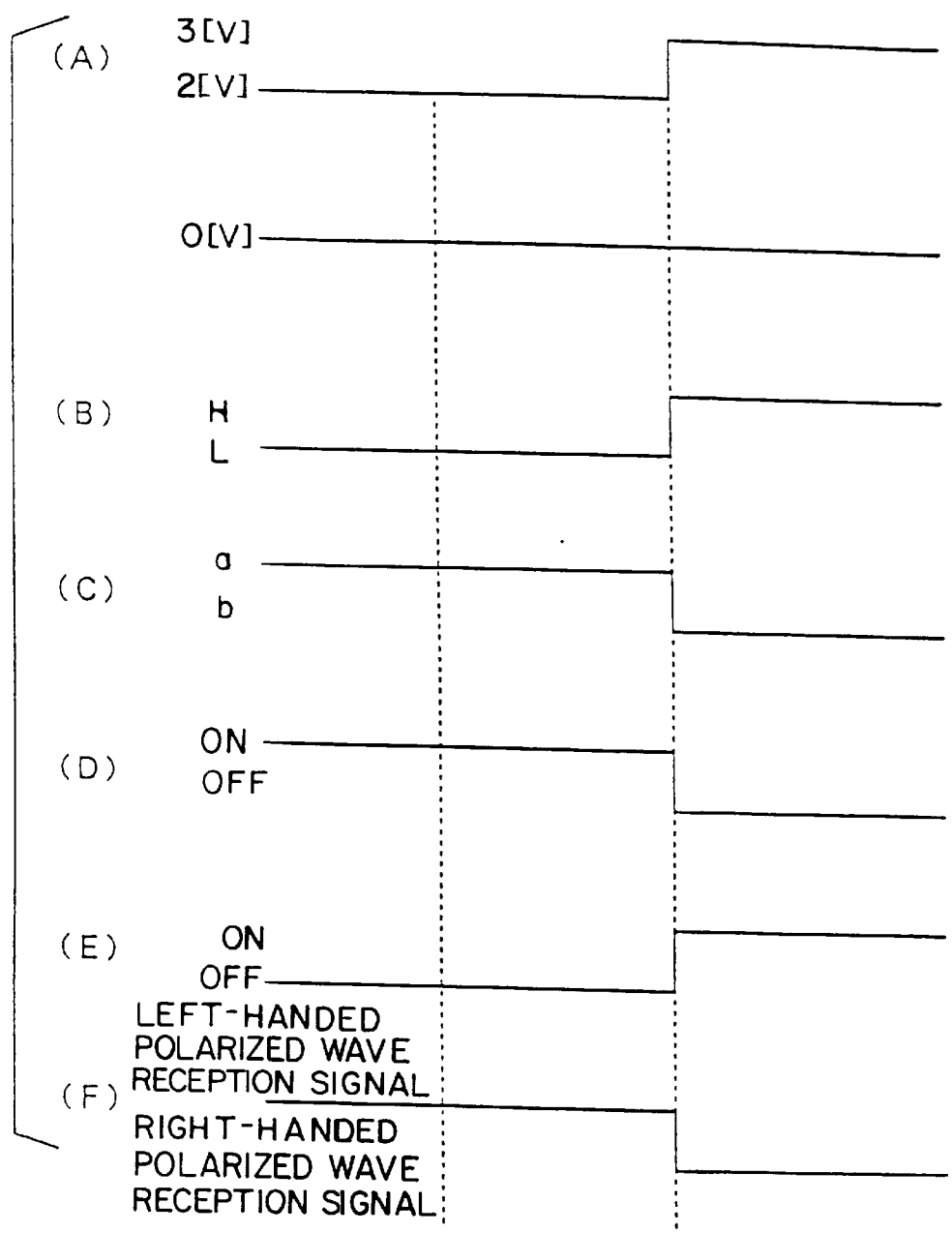
FIG. 10(A) shows a state of a direct current bias of an output terminal.
FIG. 10(B) shows a state of a control signal of a voltage detection circuit.
FIG. 10(C) shows a state of a changeover switch.
FIG. 10(D) shows an operating state of a first amplifier circuit.
FIG. 10(E) shows an operating state of a second amplifier circuit.
FIG. 10(F) shows a state of a signal output from an output terminal Tout.

FIG. 10 is a diagram for explaining the operation of this first embodiment of the present invention, FIG. 10(A) is the terminal Tout bias voltage, FIG. 10(B) is the voltage detection circuit 145 control signal, FIG. 10(C) is the changeover switch 147 state, FIG. 10(D) is the operating state of the first amplifier circuit 141, FIG. 10(E) is the operating state of the second amplifier circuit 142 and FIG. 10(F) is the state of the signal output from the output terminal Tout.

Initially, at a time t0, when the bias voltage applied to the output terminal Tout from the receiver unit is 2 [V], the voltage detection circuit 145 control signal is LOW.

When the voltage detection circuit 145 control signal is LOW, the input terminal T11 of the changeover switch 147 is connected to the output terminal T13 side. As a result, the output terminal Tout 2 [V] bias voltage is supplied to the line terminal of the first amplifier circuit 141 via the noise filter L1. The noise component of the 2[V] bias voltage is removed by the noise filter L1 and the 2[V] bias voltage is supplied to the first amplifier circuit as drive power. As a result, as shown in FIG. 10(D) the first amplifier circuit 141 is put in a state of operation.

At the same time, the second output terminal T14 of the changeover switch is put in an open state and, as shown in FIG. 10(E), no drive power is supplied to the line terminal of the second amplifier circuit 142, so the second amplifier circuit 142 is put in a state in which operation is terminated. Accordingly, only the first amplifier circuit operates and the signal received at the planar antenna element 111 is amplified at the first amplifier circuit 141 and supplied to the band-pass filter 143. As a result, as shown in FIG. 10(F) the signal received at the planar antenna element 111 is output from the output terminal Tout.

At a time t1, when the bias voltage applied to the output terminal Tout from the receiver unit becomes 3 [V], the voltage detection circuit 146 control signal becomes HIGH.

When the voltage detection circuit 146 control signal is HIGH, the changeover switch 147 input terminal T11 switches to the second output terminal T14 side. As a result, the output terminal Tout 3 [V] bias voltage is supplied to the second amplifier circuit 142 via noise filters L2, L3 and resistor R1. The noise component of the 3 [V] bias voltage is removed by the noise filters L2, L3 and, after the direct-current component alone has been extracted, the voltage reduced by the resistor R1 to a 2 [V] drive voltage, after which it is supplied to the second amplifier circuit 5 and applied as the second amplifier circuit 142 drive voltage.

A 2 [V] drive voltage is applied to the second amplifier circuit 142 and, as shown in FIG. 10(E), the second amplifier circuit 142 is put into a state of operation, amplifies the signal received at the planar antenna element 112 and supplies it to the band-pass filter 143.

At the same time, the changeover switch 147 first output terminal T13 is put in an open state and, as shown in FIG. 10(D), drive power is not supplied to the line terminal of the first amplifier circuit 141 so the first amplifier circuit 141 is put into a state in which operation is terminated. Accordingly, as shown in FIG. 10(E) only the second amplifier circuit 142 operates, the signal received at the planar antenna element 112 is amplified by the second amplifier circuit 142 and supplied to the band-pass filter 143. As a result, as shown in FIG. 10(F) the signal received at the planar antenna element 112 is output from the output terminal Tout.

According to the antenna unit 101 of the present embodiment as described above, controlling the supply of drive voltage to the first amplifier circuit 141 and the second amplifier circuit 142 controls the signal output of the first amplifier circuit 141 and the second amplifier circuit 142, thus eliminating the need to provide on the signal path a signal switch, that is, a signal-pass type switch IC. Accordingly, the means for performing the switching of a switch IC, etc. is not positioned atop the signal path and thus signal loss can be reduced.

It should be noted that the present embodiment is configured so that no changeover switch is mounted on the signal path. However, it is also possible to switch the signal received at the planar antenna element 111 or the signal received at the planar antenna element 112 by switching a changeover switch mounted on the signal path.

Figure 11:
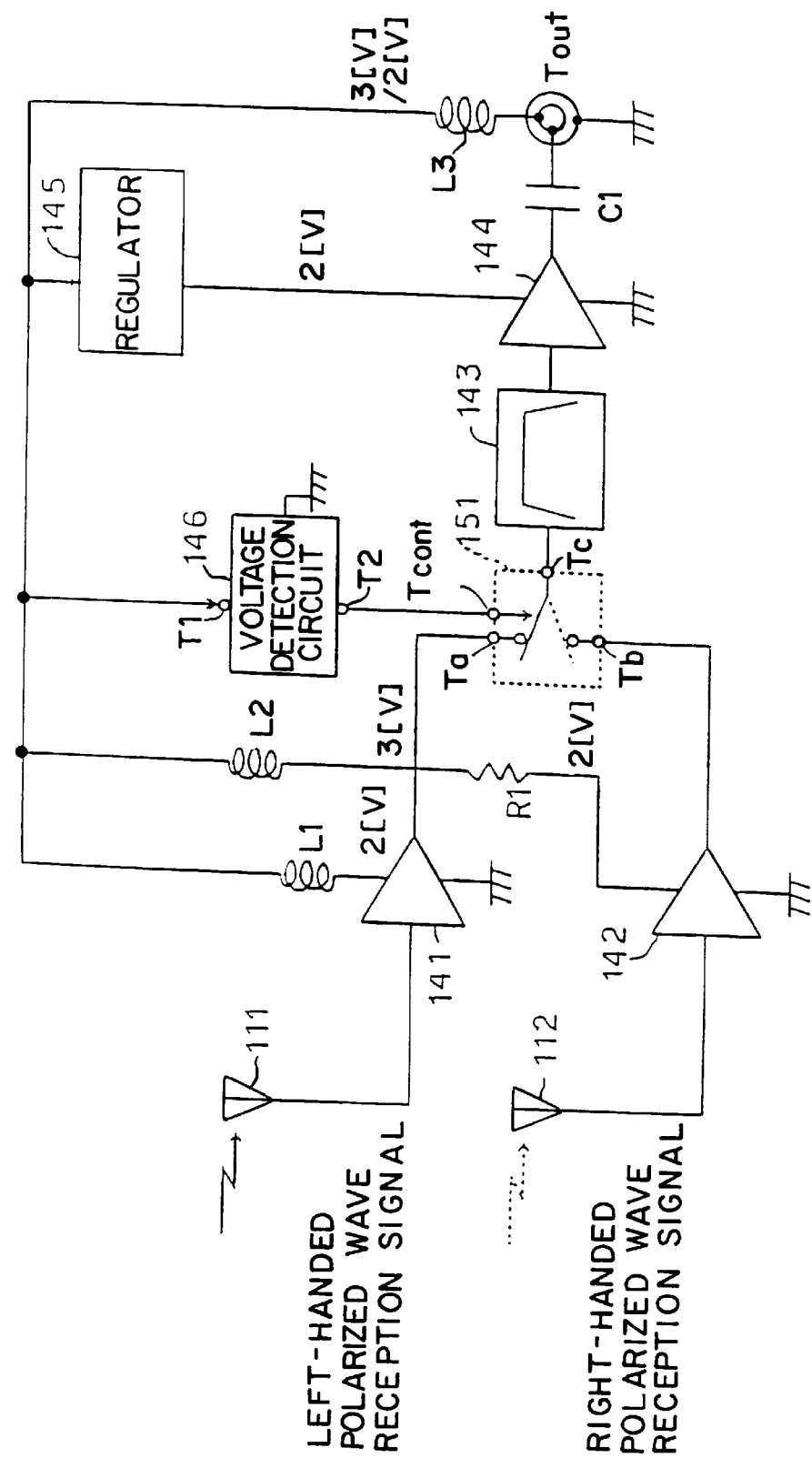
FIG. 11 is a block diagram showing a variation of the circuit configured on a circuit substrate of a first embodiment of the present invention.

FIG. 11 is a block diagram showing a variation of the circuit configured on a circuit substrate of a first embodiment of the present invention. Component items identical to those shown in FIG. 8 are identically numbered and description thereof omitted.

A switch circuit 151 for selectively switching between a signal amplified by the first amplifier circuit 141 and a signal amplified by the second amplifier circuit and supplying same to the band-pass filter 143 is mounted on the circuit substrate 113 of the present variation.

A signal received at antenna element 111 and amplified by the first amplifier circuit 141 and a signal received at antenna element 112 and amplified by the second amplifier circuit 142 are supplied to the switch circuit 151, which selectively outputs one or the other signal.

Switch circuit 151 comprises a signal-pass type switch IC (integrated circuit). Switch 151 outputs one or the other of either the first amplifier circuit output signal or the second amplifier circuit output signal, depending on the control signal supplied to the control terminal Tcont from the voltage detection circuit 146. The output signal selected at the switch circuit 151 is supplied to the band-pass filter 143.

Additionally, the first amplifier circuit 142 line terminal is connected to the output terminal Tout via noise filters L1, L3 and a 3 [V]/2 [V] direct-current bias supplied from the receiver unit 103 is applied to the output terminal Tout. The first amplifier circuit 141, when 2 [V] is supplied as the drive voltage, that is, when the output terminal Tout direct-current bias voltage is 2 [V], operates steadily, amplifies the reception signal supplied from the planar antenna element 111 and supplies it to the input terminal Ta of the switch circuit 151.

Additionally, the line terminal of the second amplifier circuit 142 is connected to the output terminal Tout via the noise filters L2, L3. A 3 [V]/2 [V] direct-current bias is applied to the output terminal Tout from the receiver unit 103. The second amplifier circuit 142, when the output terminal Tout direct-current voltage component is 3 [V], is supplied with a 2 [V] drive voltage reduced by the resistor R1. The second amplifier circuit 142, when supplied with 2 [V] as a drive voltage, that is, when the output terminal Tout direct-current voltage component is 3 [V], operates steadily, amplifies the reception signal supplied from the planar antenna element 112 and supplies it to the input terminal Tb of the switch circuit 151.

The signal selected at the switch circuit 151 is supplied to the band-pass filter 123.

Additionally, the voltage detection circuit 146 detection terminal T1 is supplied with direct-current bias voltage from the output terminal Tout via the filter L3. The voltage detection circuit 146 may be composed of a reset IC having an open collector output, for example, and detect a voltage supplied to the detection terminal T1 and output either a HIGH or a LOW control signal from the control terminal T2.

If the voltage supplied to the detection terminal T1 is approximately 2 [V], then the voltage detection circuit 146 turns the output transistor ON, putting the control terminal T2 in a short-circuited state. If the voltage supplied to the detection terminal T1 is 3 [V], then the voltage detection circuit 146 turns the output transistor OFF, putting the control terminal T2 in an open state. The voltage detection circuit 146 control terminal T2 is supplied to the switch circuit 151 control terminal Tcont.

As described above, the switch circuit 151 input terminal Ta is connected to the first amplifier circuit 141 output terminal, the switch circuit 151 input terminal Tb is connected to the second amplifier circuit 142 output terminal and the switch circuit 151 output terminal Tc is connected to the band filter 143. Either input terminal Ta or input terminal Tb is selectively connected to the output terminal Tc depending on the level of the control terminal Tcont to which the control terminal T2 of the voltage detection circuit 146 is connected.

When control terminal Tcont is HIGH, that is, when 3 [V] is detected as the voltage of output terminal Tout by the voltage detection circuit 146, the output transistor turns OFF and the control terminal T2 is in an open state, the switch circuit 151 connects input terminal Tb to output terminal Tc. When control terminal Tcont is LOW, that is, when 2 [V] is detected as the voltage of output terminal Tout by the voltage detection circuit 146, the output transistor turns ON and the control terminal T2 is in an open state, the switch circuit 151 connects input terminal Ta to output terminal Tc.

Figure 12:
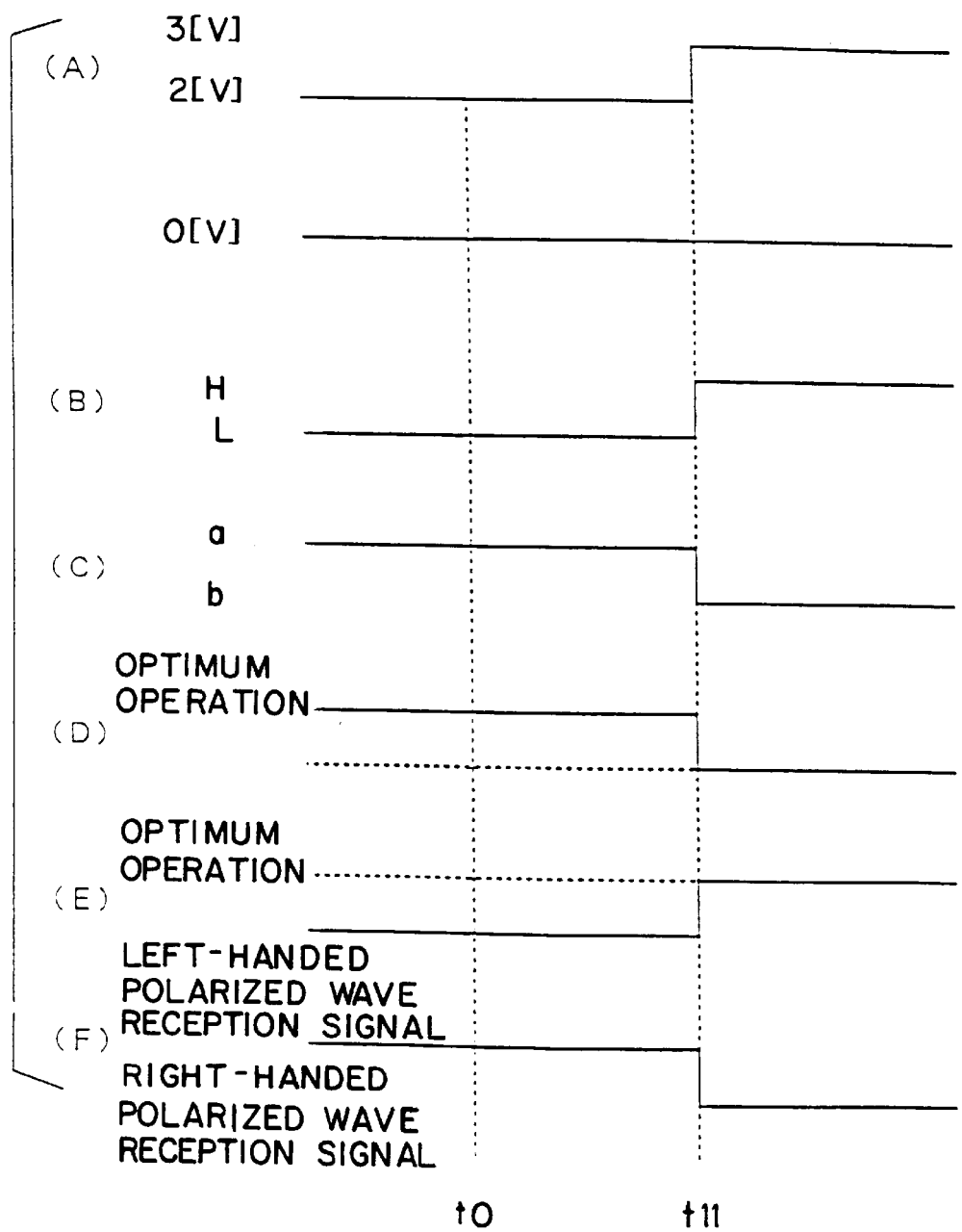
FIG. 12(A) shows a state of a direct current bias of an output terminal Tout.
FIG. 12(B) shows a state of a control signal of voltage detection circuit.
FIG. 12(C) shows a state of a switch circuit.
FIG. 12(D) shows an operating state of a first amplifier circuit.
FIG. 12(E) shows an operating state of a second amplifier circuit.
FIG. 12(F) shows a state of a signal output from an output terminal Tout.

FIG. 12 is a diagram for explaining the operation of a variation of the circuit configured on the circuit substrate of a first embodiment of the present invention. FIG. 12(A) shows the state of the direct-current bias of the output terminal Tout; FIG. 12(B) shows the state of the control signal of the voltage detection circuit; FIG. 12(C) shows the state of the switch circuit; FIG. 12(D) shows the operating state of the first amplifier circuit; FIG. 12(E) shows the operating state of the second amplifier circuit; and FIG. 12(F) shows the state of the signal output from the output terminal Tout.

Initially, at a time t0, when the bias voltage applied to the output terminal Tout from the receiver unit is 2 [V], the voltage detection circuit 146 control signal is LOW.

When the voltage detection circuit 146 control signal is LOW, the switch circuit 151 input terminal Ta is connected to the output terminal Tc. As a result, the first amplifier circuit 141 output signal is supplied to the band filter 143. At this time, as shown in FIG. 12(D), the 2 [V] bias voltage of the output terminal Tout from which the signal element has been removed by the noise filter L1 is supplied as drive power to the first amplifier circuit 141 and so operates normally.

At the same time, the noise component of the 2 [V] bias voltage supplied to the output terminal Tout is removed by the noise filters L2, L3 and, further, the voltage reduced by resistor R1 and supplied as voltage of 2 [V] or less to the second amplifier circuit 142 and so, as shown in FIG. 12(E), does not operate steadily.

However, at this time, only the first amplifier circuit 141 operates steadily, the signal is amplified and that output signal is selected by the switch circuit 151, so the signal received at the planar antenna element 111 is amplified by the first amplifier circuit 141 and supplied to the band-pass filter 143. As a result, as shown in FIG. 12(F), the signal received by the planar antenna element 111 is output from the output terminal Tout.

Next, at a time t1, when the bias voltage applied to the output terminal Tout from the receiver unit becomes 3 [V] the voltage detection circuit 146 control signal becomes HIGH.

When the voltage detection circuit 146 control signal becomes HIGH, the switch circuit 151 input terminal Tb is connected to the output terminal Tc. As a result, the second amplifier circuit 142 output signal is supplied to the band filter 143.

At this time, as shown in FIG. 12(D), the 3 [V] bias voltage of the output terminal Tout is supplied as drive power to the first amplifier circuit 141 via the noise filters L1, L3. The first amplifier circuit 141 operates steadily when the drive voltage is 2 [V], so the first amplifier circuit 141 does not operate steadily at this time.

At the same time, the noise component of the 3 [V] bias voltage of the output terminal Tout is removed by the noise filters L2, L3 and, further, the voltage reduced by resistor R1 and supplied as voltage of 2 [V] to the second amplifier circuit 142. The second amplifier circuit 142 operates steadily at a voltage of 2 [V] and so, as shown in FIG. 12(E), enters a state of stable operation.

Accordingly, only the second amplifier circuit 142 operates normally, signal amplification is performed and that output signal selected by the switch circuit 151, so the signal received by the planar antenna element 112 is amplified by the second amplifier circuit 142 and supplied to the band-pass filter 143. As a result, as shown in FIG. 12(F), the signal received by the planar antenna element 112 is output from the output terminal Tout. It should be noted that, at this time, it is sufficient that the output of the second amplifier circuit 142 is normal. That is, it is acceptable that the first amplifier circuit 141 drive voltage is 3 [V] and that the first amplifier circuit 141 does not operate steadily.

According to the above-described present embodiment, by controlling the output terminal bias voltage the signals can be switched, and the wiring can be simplified because there is no need for a dedicated control wire to perform switching.

Figure 13:
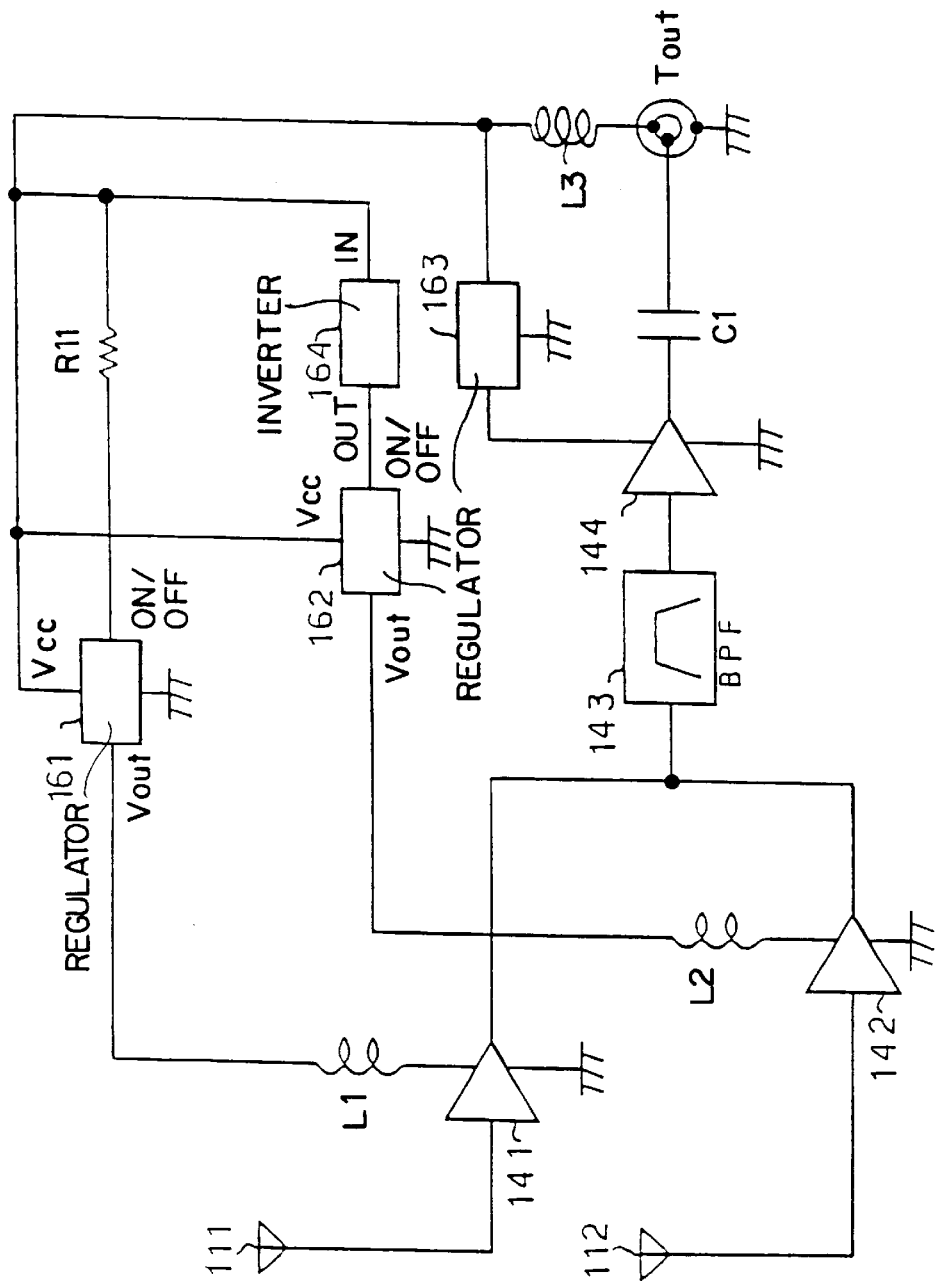
FIG. 13 is a block diagram of another variation of the circuit configured on a circuit substrate of a first embodiment of the present invention.

FIG. 13 is a block diagram of another variation of the circuit configured on a circuit substrate of a first embodiment of the present invention. Component items identical to those shown in FIG. 8 are identically numbered and description thereof omitted.

With the circuit substrate 113 of the present variation, controlling the drive voltage supplied to the first amplifier circuit 141 and the second amplifier circuit 142 according to the direct-current bias supplied to the output terminal Tout controls the signals received at the planar antenna element 111 and the signals received at the planar antenna element 112.

The circuit substrate 113 of the present variation has a regulator 161 for converting the direct-current voltage supplied to the output terminal Tout to a predetermined voltage and supplying it as drive power to the first amplifier circuit 141 via noise filter L1; a regulator 162 for converting the direct-current bias supplied to the output terminal Tout to a predetermined voltage and supplying it as drive power to the second amplifier circuit 142 via noise filter L2; a regulator 163 for converting the direct-current bias supplied to the output terminal Tout to a predetermined voltage and supplying it as drive power to the output amplifier circuit 144; a resistor R11 for generating a control signal for controlling the ON/OFF operation of the regulator 161 according to the direct-current bias supplied to the output terminal Tout; and an inverter 164 for inverting the direct-current bias supplied to the output terminal Tout and generating a control signal for controlling the ON/OFF operation of the regulator 162.

The regulator 161 is supplied with a 2 [V] or 3 [V] direct-current bias from the output terminal Tout. Regulator 161 generates a 2 [V] drive voltage from the 2 [V] or 3 [V] direct-current bias supplied from the output terminal Tout. The drive voltage generated at the regulator 161 is supplied to the line terminal of the first amplifier circuit 141.

The first amplifier circuit 141 operates steadily on the 2 [V] drive voltage supplied from the regulator 161. It should be noted that another power stabilizing device may be substituted for the regulator 161.

Additionally, regulator 161 is a regulator having a switching function capable of controlling an ON/OFF operation according to an external control voltage, and can turn an operation ON and OFF in response to a control signal. The control signal supplied to the regulator 161 is the direct-current bias supplied to the output terminal Tout and reduced in voltage by passing through the resistor R1. Regulator 161 turns ON an operation when the direct-current bias is 3 [V] and turns OFF an operation when the direct-current bias is 2 [V].

Additionally, regulator 162 is a regulator having a switching function capable of controlling an ON/OFF operation according to an external control voltage. The control signal supplied to the regulator 162 is the direct-current bias supplied to the output terminal Tout and inverted by the inverter 164. Regulator 162 turns OFF an operation when the direct-current bias is 3 [V] and turns ON an operation when the direct-current bias is 2 [V].

When regulator 161 operation is ON a 2 [V] drive voltage is supplied from regulator 161 to the first amplifier circuit 141 and the first amplifier circuit 141 is driven. When the first amplifier circuit 141 is driven the signal received at the planar antenna element 111 is amplified and supplied to the band-pass filter 143. It should be noted that, at this time, regulator 162 operation turns OFF and so no drive voltage is supplied to the second amplifier circuit 142 and the signal received at the planar antenna element 112 is not supplied to the band-pass filter 143.

When the operation of regulator 162 is ON, a 2 [V] drive voltage is supplied from the regulator 162 to the second amplifier circuit 142 and the second amplifier circuit 142 is driven. When the second amplifier circuit 142 is driven the planar antenna element 112 reception signal is amplified and supplied to the band-pass filter 143. It should be noted that, at this time, the operation of regulator 161 turns OFF, the first amplifier circuit 141 is not supplied with a drive voltage and the planar antenna element 111 reception signal is not supplied to the band-pass filter 143.

Additionally, the output terminal Tout is connected to the regulator 163 via the filter L3 and a voltage of 2 [V] is generated from the direct-current bias voltage supplied to the output terminal Tout. The 2 [V] of voltage generated at the regulator 163 is supplied as drive voltage to the output amplifier circuit 144. The output amplifier circuit 144 operates steadily on the 2 [V] of drive voltage supplied from the regulator 163, amplifies the band-pass filter 143 output signal and supplies it to the output terminal Tout via the condenser C1.

Figure 14:
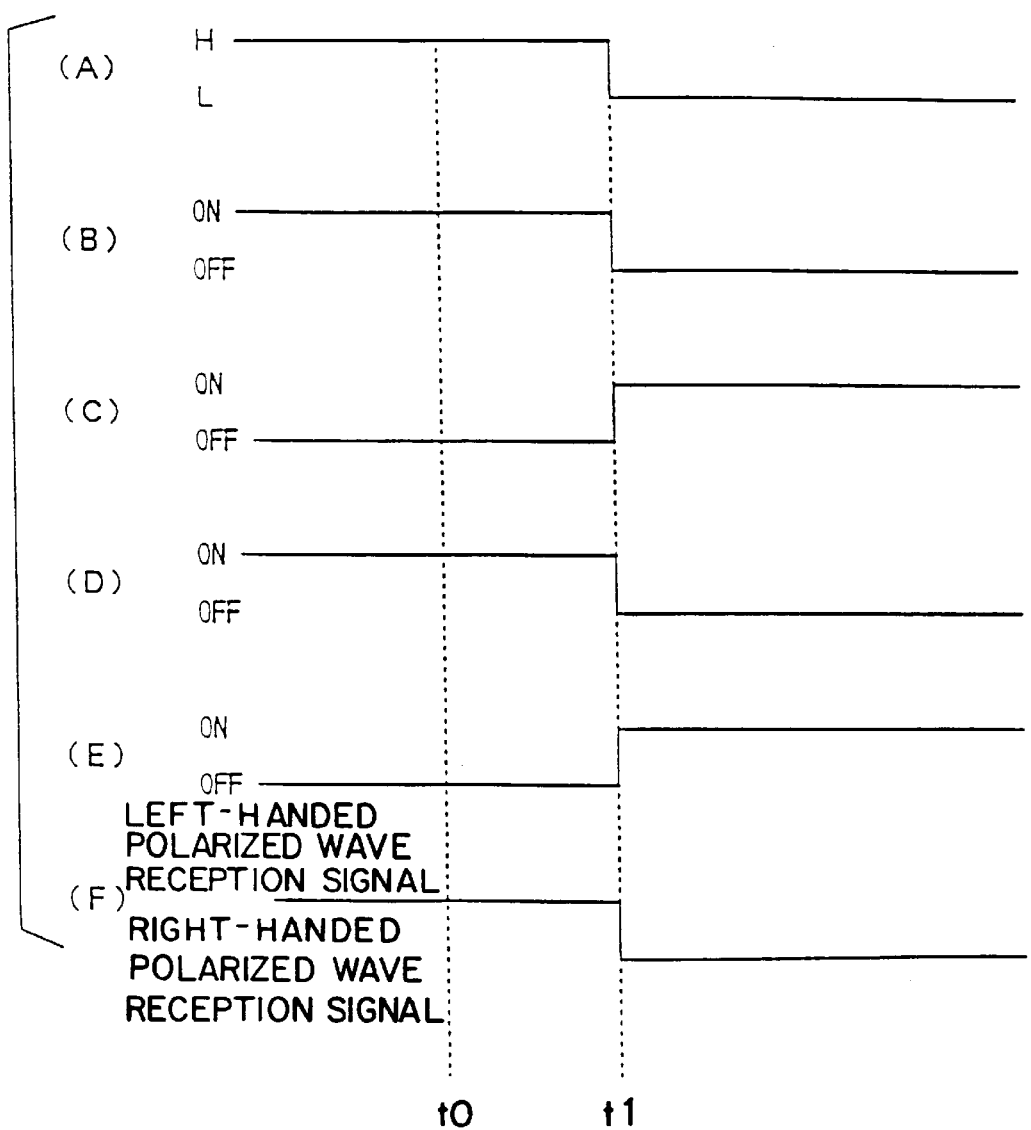
FIG. 14(A) shows a state of a direct current bias of an output terminal Tout.
FIG. 14(B) shows an operating state of a regulator.
FIG. 14(C) shows an operating state of a regulator.
FIG. 14(D) shows an operating state of a first amplifier circuit.
FIG. 14(E) shows an operating state of a second amplifier circuit.
FIG. 14(F) shows a state of a signal output from an output terminal Tout.

FIG. 14 is a diagram for explaining the operation of another variation of the circuit configured on the circuit substrate of a first embodiment of the present invention. FIG. 14(A) shows a state of a direct current bias of an output terminal Tout; FIG. 14(B) shows an operating state of a regulator; FIG. 14(C) shows an operating state of a regulator; FIG. 14(D) shows an operating state of a first amplifier circuit; FIG. 14(E) shows an operating state of a second amplifier circuit; FIG. 14(F) shows a state of a signal output from an output terminal Tout.

At a time t0, as shown in FIG. 14(A) the direct-current bias applied to the output terminal Tout from the receiver unit 103 is HIGH, that is, 3 [V]. When the output terminal Tout direct-current bias is HIGH, the ON/OFF control voltage is HIGH and, as shown in FIG. 14(B), the regulator 161 enters an ON state. When regulator 161 enters an ON state, regulator 161 supplies a 2 [V] drive voltage to the first amplifier circuit 141 and, as shown in FIG. 14(D), the first amplifier circuit 141 enters an ON state and operates.

At the same time, the ON/OFF control voltage supplied to the regulator 162 becomes LOW because it has been inverted by the inverter 164 and, as shown in FIG. 14(C), the regulator 162 enters an OFF state. When regulator 162 enters an OFF state, regulator 162 no longer supplies voltage to the second amplifier circuit 142, and thus, as shown in FIG. 14(E), the second amplifier circuit 142 enters an OFF state and terminates operation.

Accordingly, at a time to only the first amplifier 141 operates and the signal amplified, and the signal received at the planar antenna element 111 is amplified at the first amplifier circuit 141 and supplied to the band-pass filter 143. As a result, as shown in FIG. 14(F), from the output terminal Tout the signal received at the planar antenna element 111 is output.

At a time t1, as shown in FIG. 14(A), the direct-current bias applied to the output terminal Tout from the receiver unit is LOW. When the output terminal Tout direct-current bias is LOW the ON/OFF control voltage supplied to the regulator 161 is LOW and, as shown in FIG. 14(B), regulator 161 enters an OFF state. When regulator 161 enters an OFF state, regulator 161 does not supply a drive voltage to the first amplifier circuit 141, so the first amplifier circuit 141 enters an OFF state and terminates operation as shown in FIG. 14(D).

At the same time, the ON/OFF control voltage supplied to the regulator 162 becomes HIGH because it has been inverted by the inverter 164 and, as shown in FIG. 14(C), the regulator 162 enters an ON state. When regulator 162 enters an ON state, regulator 162 supplies voltage to the second amplifier circuit 142, and thus, as shown in FIG. 14(E), the second amplifier circuit 142 enters an ON state and performs operation.

Accordingly, at a time t1 only the second amplifier 142 operates and the signal amplified, and the signal received at the planar antenna element 112 is amplified at the second amplifier circuit 142 and supplied to the band-pass filter 143. As a result, as shown in FIG. 14(F), from the output terminal Tout the signal received at the planar antenna element 112 is output.

As described above, according to the present embodiment, the output signal can be switched by controlling the output terminal Tout direct-current voltage, and because the need for dedicated control wiring is eliminated the wiring can be simplified. Further, there is no need to insert a signal pass type changeover switch between the signal wires through which the reception signal passes, so the problem of signal loss does not arise. Further, only one of either the first or second amplifier circuits 141, 142 that amplify the signals received at the planar antenna elements 111, 112 operates at a time, making it possible to reduce power consumption.

According to the present embodiment, the only connection between the antenna unit 101 and the receiver 103 is the cable 102 composed of the signal wires that supply the signals received at the antenna unit 101 to the receiver unit 103. It is sufficient simply to switch the direct-current bias that supplies power to the antenna unit 101 via the cable 102 to LOW or HIGH and there is no need for dedicated antenna-switching signal wires.

It should be noted that the present embodiment is configured so as to amplify left- and right-handed polarized wave signals supplied from left- and right-handed polarized wave reception antennae, extract only essential components of the reception signals using a band filter and amplifying the signals extracted by the band filter using an amplifier. However, it is also possible to use only an amplifier to amplify the left- and right-handed polarized wave signals supplied from the left- and right-handed polarized wave antennae.

Further, the present embodiment described an antenna unit in which a signal switching circuit was used when selecting the reception signals received at one reception surface from a planar antenna having a plurality of reception surfaces receiving differently polarized waves. However, the present invention is not limited to the above-described embodiment and, for example, can also be adapted so as to switch reception signals from antenna elements of a diversity antenna having different reception directions. Additionally, the present invention is not limited to antennae but can also be adapted for use with a circuit that selects and outputs one designated signal out of two input signals.

Additionally, the antenna unit 101 of the present embodiment detects left- and right-handed polarized waves. However, the present invention is not limited to the above-described embodiment but can also be adapted to use a DAB system antenna unit that receives, stacks and outputs satellite broadcasts and terrestrial broadcasts.

Figure 15:
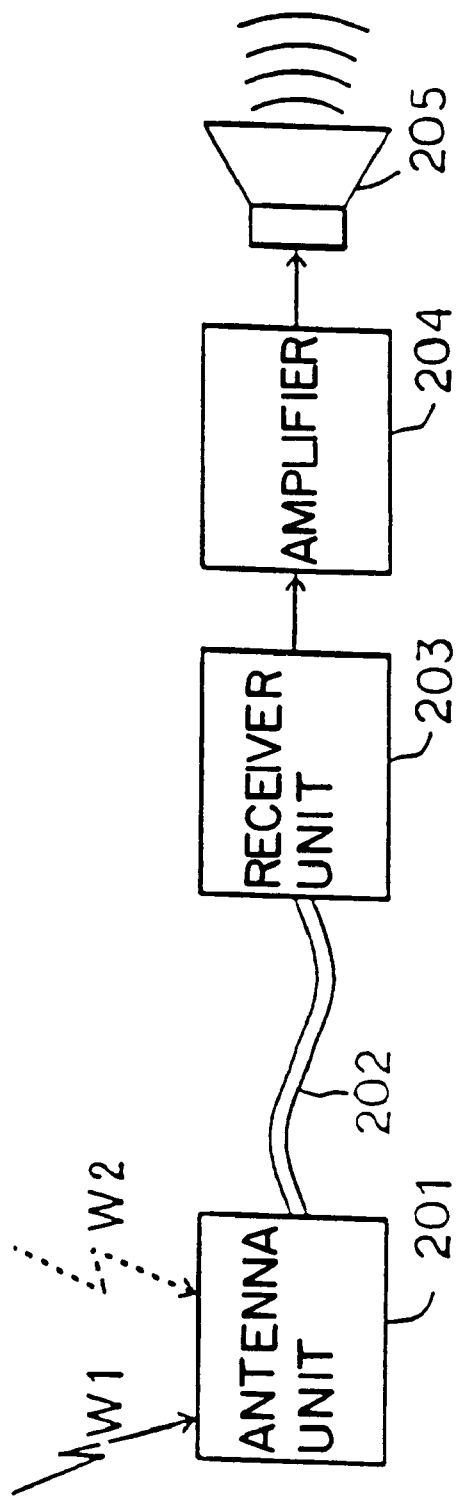
FIG. 15 is a block diagram of a second embodiment of the present invention.

FIG. 15 is a block diagram of a second embodiment of the present invention. The receiver system 200 of the present embodiment comprises an antenna unit 201 that receives DAB satellite transmissions W1 and terrestrial transmissions W2 and stacks and outputs the received satellite transmission signals and terrestrial transmission signals; a receiver unit 203 connected to the antenna unit that separates the stacked satellite broadcast signals and the terrestrial broadcast signals and demodulates the broadcast signals of the channel selected from both the satellite broadcast signals and the terrestrial broadcast signals; a cable 202 that connects the antenna unit 201 and the receiver unit 203; an amplifier 204 that amplifies the broadcast signals demodulated by the receiver unit 203; and a speaker 205 that outputs the broadcast signals amplified at the amplifier 204 as audio.

Figure 16:
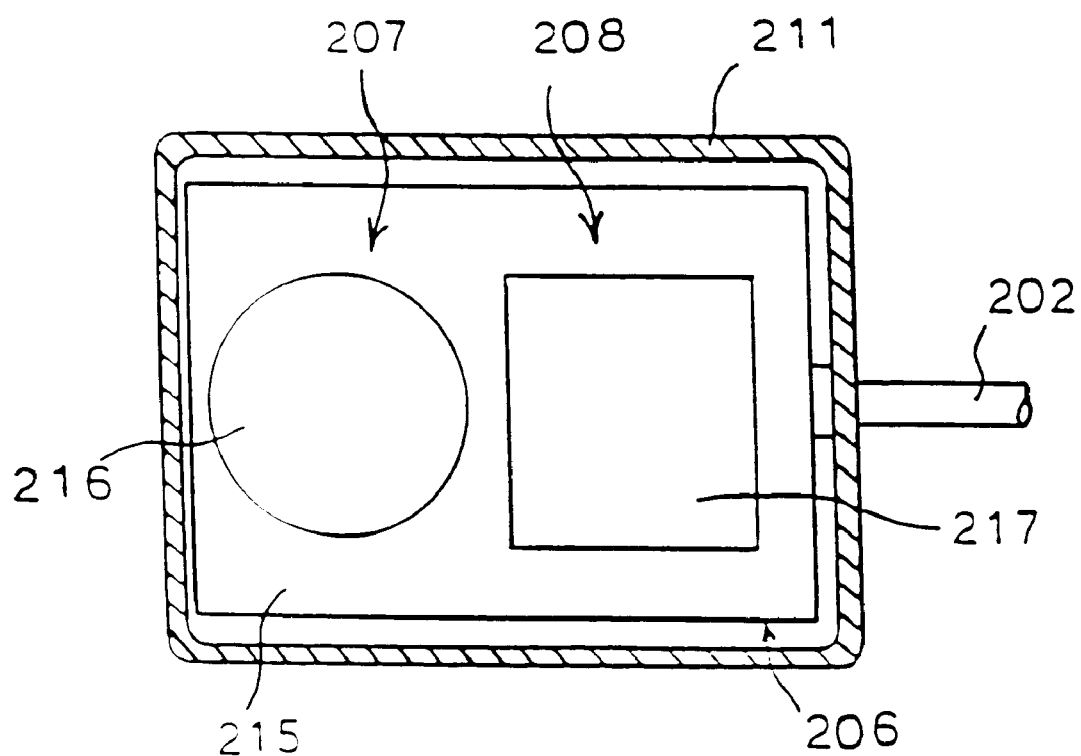
FIG. 16 is a horizontal cross-sectional view of an antenna unit of a second embodiment of the present invention.
Figure 17:
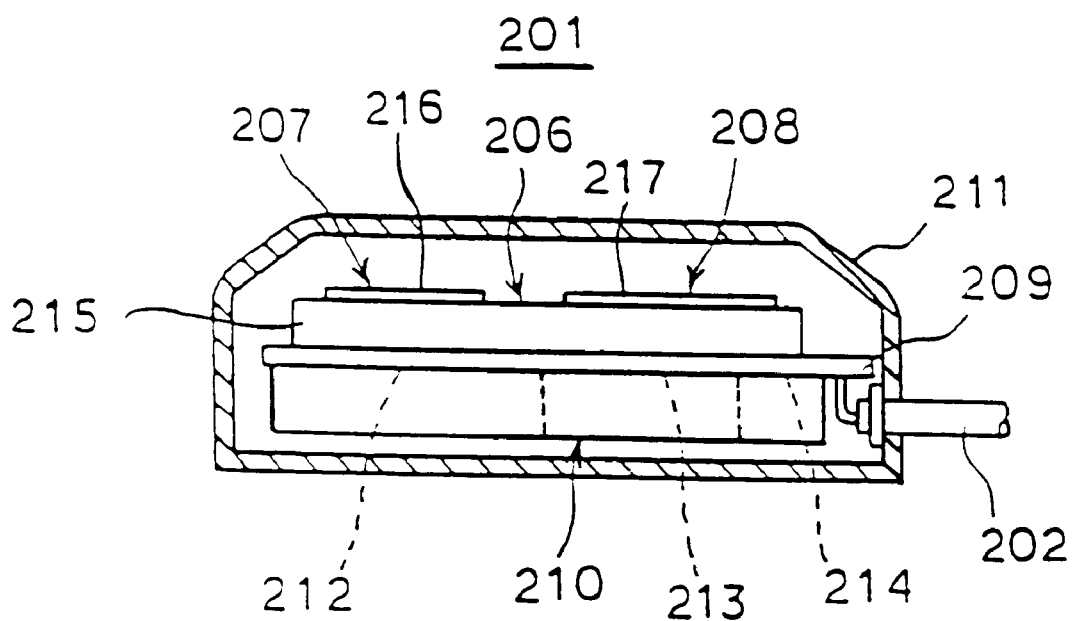
FIG. 17 is a vertical cross-sectional view of an antenna unit of a second embodiment of the present invention.

FIG. 16 is a horizontal cross-sectional view of an antenna unit of a second embodiment of the present invention and FIG. 17 is a vertical cross-sectional view of an antenna unit of a second embodiment of the present invention.

The antenna unit 201 of the present embodiment comprises a planar antenna apparatus 206 for receiving satellite broadcast transmissions and terrestrial broadcast transmissions; a circuit substrate 209 mounting a circuit that stacks and outputs satellite broadcast signals received by a satellite broadcast reception antenna element 207 of the planar antenna apparatus 206 and VHF broadcast signals received by a VHF broadcast reception antenna element 208; a shield casing 210 for shielding the circuit substrate 209; and a casing 211 for integratably housing the planar antenna apparatus 206 and the circuit substrate 209.

In the planar antenna element 206, the satellite broadcast reception antenna element 207 and the VHF broadcast reception antenna element 208 are formed into a single unit. The planar antenna element 206 converts the satellite transmission received by the satellite broadcast reception antenna element 207 into an electric signal and supplies it to the circuit substrate 209 and, at the same time, converts the VHF transmission received by the VHF broadcast reception element 208 into an electric signal and supplies it to the circuit substrate 209.

On the circuit substrate 209 are integratably mounted on a single print substrate a satellite broadcast signal processing circuit portion 212 for amplifying and filtering satellite broadcast signals converted by the satellite broadcast reception antenna element 207; a VHF broadcast signal processing circuit portion 213 for amplifying and filtering VHF broadcast signals converted by the VHF broadcast reception antenna element 208; and a mixing circuit portion 214 for mixing the satellite broadcast signals processed by the satellite broadcast signal processing circuit portion 212 and the VHF broadcast signals processed by the VHF broadcast signal processing circuit portion 213.

The satellite broadcast signals converted by the satellite broadcast reception antenna element 207 are supplied to the satellite broadcast signal processing circuit portion 212 of the circuit substrate 209 and the VHF broadcast signals converted by the VHF broadcast reception antenna element 108 are supplied to the VHF broadcast signals processing circuit portion 213 of the circuit substrate 209 separately, respectively. The satellite broadcast signals processed by the satellite broadcast signal processing circuit portion 212 and the VHF broadcast signals processed by the VHF broadcast signals processing circuit portion 213 are supplied to the mixing circuit portion 214 of the circuit substrate 209 and, after being mixed, are output from the cable 202.

The satellite broadcast signal processing circuit portion 212, the VHF broadcast signals processing circuit portion 213 and the mixing circuit portion 214 of the circuit substrate 209 operate on L-band high-frequency waves and so are easily affected by noise. Accordingly, these elements are reciprocally electromagnetically shielded by the shield casing 210.

A detailed description will now be given of the planar antenna element 206 by reference to the drawings.

Figure 18:
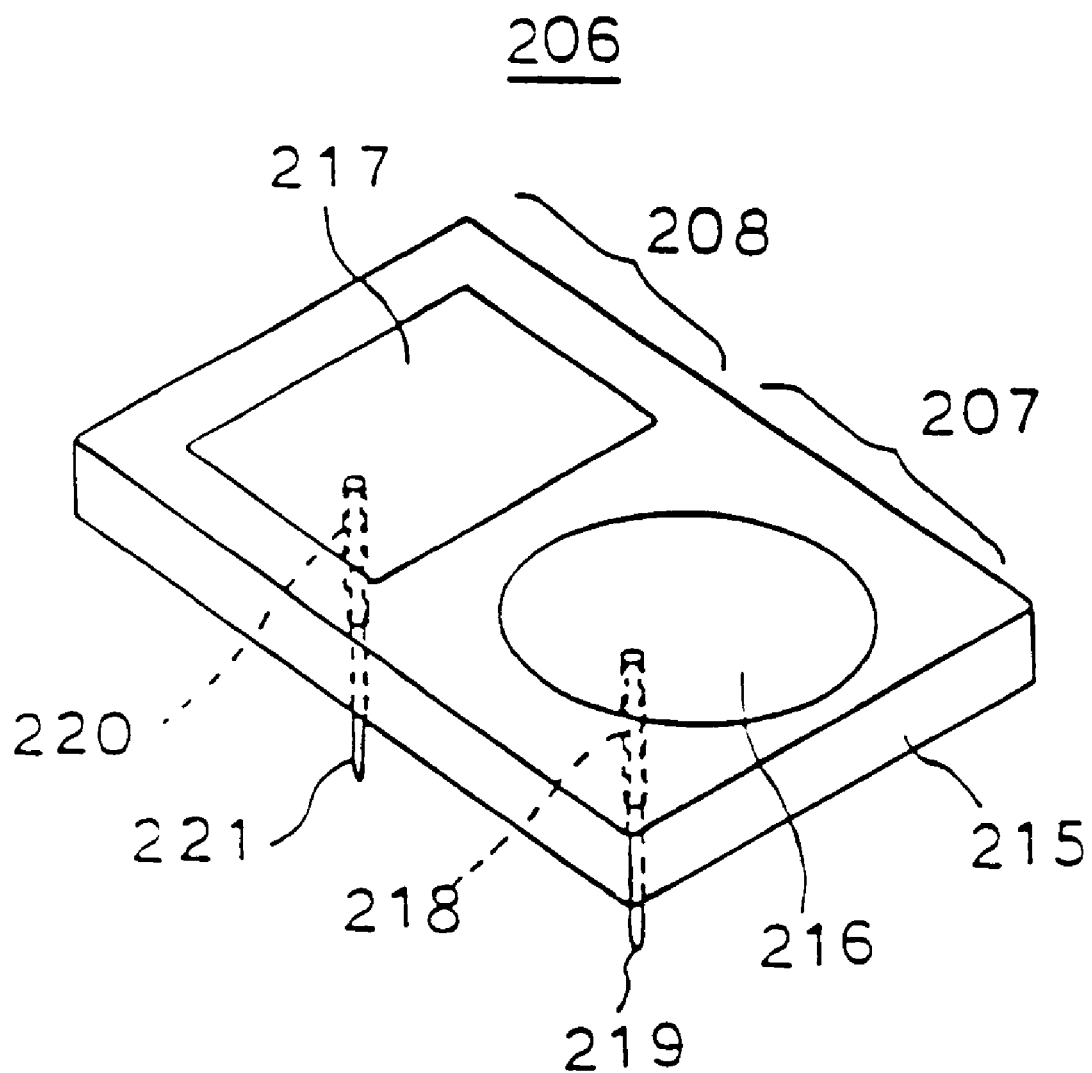
FIG. 18 is an oblique view of a planar antenna element of a second embodiment of the present invention.
Figure 19:
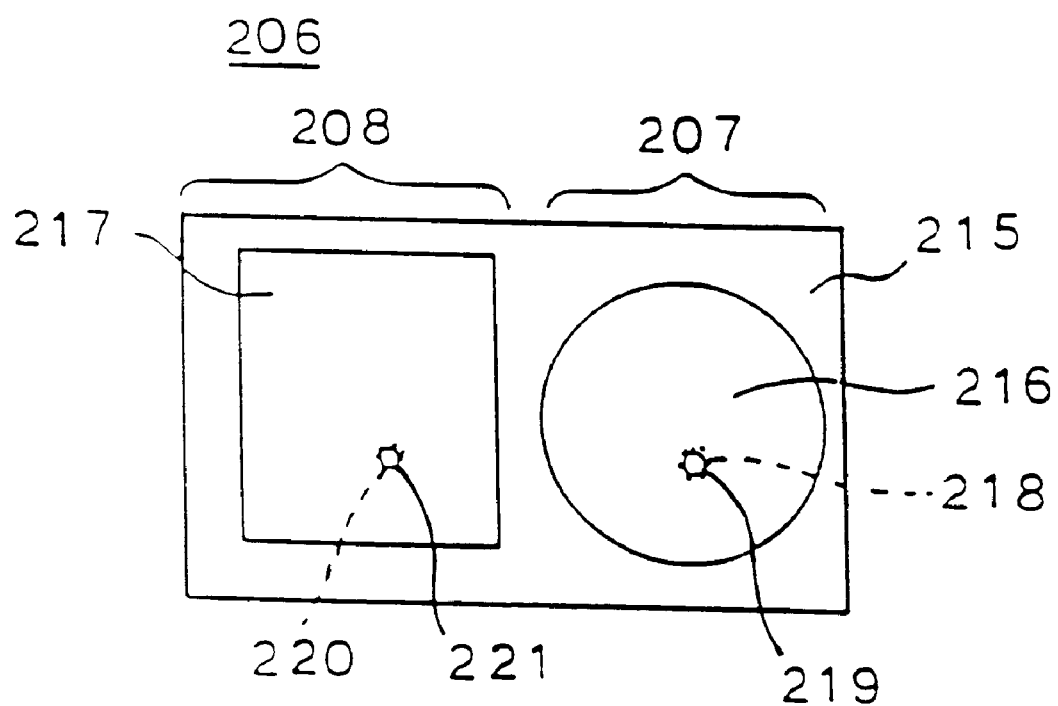
FIG. 19 is a surficial view of a planar antenna element of a second embodiment of the present invention.
Figure 20:
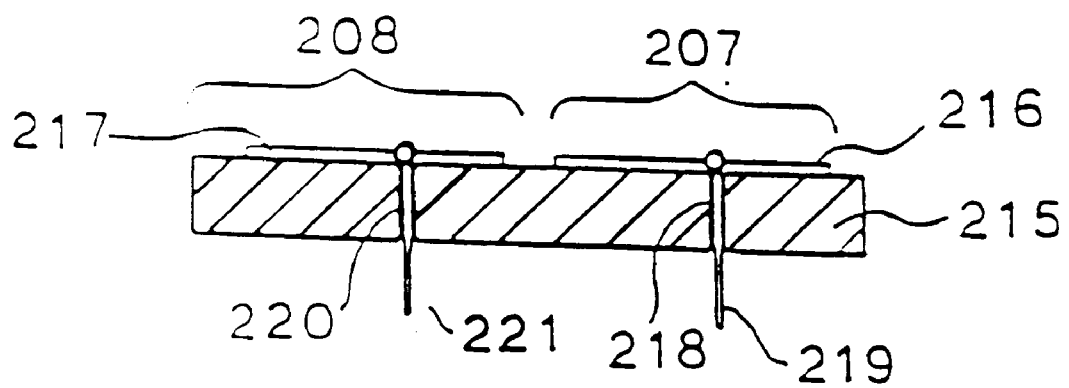
FIG. 20 is a cross-sectional view of a planar antenna element of a second embodiment of the present invention.

FIG. 18 is an oblique view of a planar antenna element of a second embodiment of the present invention, FIG. 19 is a surficial view of a planar antenna element of a second embodiment of the present invention and FIG. 20 is a cross-sectional view of a planar antenna element of a second embodiment of the present invention.

The planar antenna element 206 is composed of a VHF transmission reception conductive film 217 and a satellite transmission reception conductive film 216 made of a conductive substance such as metal formed on an identical surface of a dielectric substrate 215 made from a dielectric material such as dielectric ceramics. On the portion of the dielectric substrate 215 on which is formed the satellite transmission reception conductive thin film 216 there is formed a through-hole aperture 218, and a connecting pin 219 is inserted through the through-hole aperture 218. The connecting pin 219 is soldered to the satellite transmission reception conductive film 216 and the other end is connected to the satellite broadcast signal processing circuit portion 212 of the circuit substrate 209.

Additionally, the portion of the dielectric substrate 215 on which is formed the VHF transmission reception conductive film 217 there is formed a through-hole aperture 220, and a connecting pin 221 is inserted through the through-hole aperture 220. The connecting pin 221 is soldered to the VHF transmission reception conductive film 217 and the other end is connected to the VHF broadcast signals processing circuit portion 213 of the circuit substrate 209.

A detailed description will now be given of the circuit substrate 209 with reference to the drawing.

Figure 21:
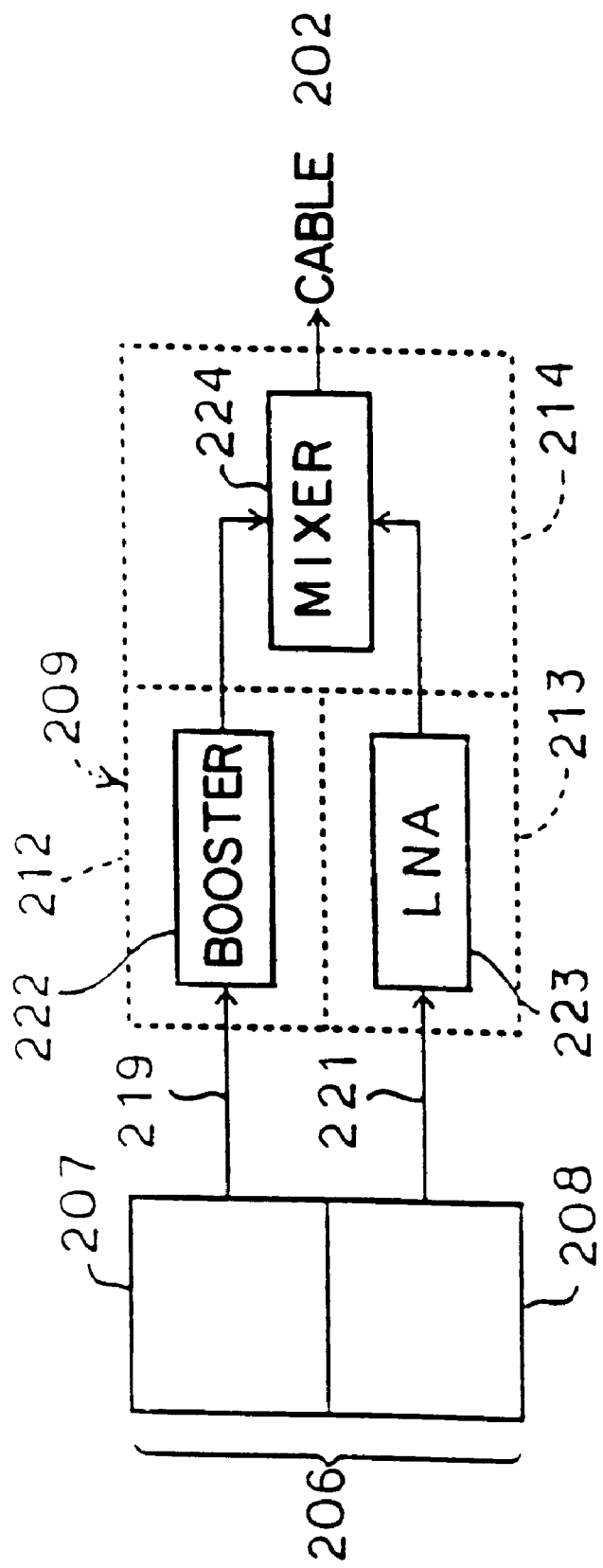
FIG. 21 is a block diagram of a circuit substrate of an embodiment of the present invention.

FIG. 21 is a block diagram of a circuit substrate of an embodiment of the present invention. The satellite broadcast signal processing circuit portion 212 of the circuit substrate 209 chiefly comprises a booster 222, and boosts and outputs the satellite broadcast signals supplied from the satellite broadcast reception antenna element 207 of the planar antenna element 206 via the connecting pin 219. The VHF broadcast signal processing circuit portion 213 of the circuit substrate 209 chiefly comprises an LNA (Low-Noise Amplifier) 223, and low-noise amplifies and outputs the VHF broadcast signals supplied from the VHF broadcast reception antenna element 208 of the planar antenna element 206 via the connecting pin 221.

The satellite broadcast signals boosted by the booster 222 and the VHF broadcast signals low-noise amplified by the LNA 223 are supplied to the mixer circuit portion 214 of the print wiring on the circuit substrate 209. The mixer circuit portion 214 chiefly comprises the mixer 224, and mixes the satellite broadcast signals boosted by the booster 222 and the VHF broadcast signals low-noise amplified by the LNA 223 and outputs them to the cable 202.

It should be noted that a direct-current bias from the receiver unit 203 side is supplied to the cable 202 and the individual circuits mounted on the circuit substrate 209 are driven by the direct-current bias supplied from the receiver unit 203 via the cable 202.

The antenna unit 201 is, for example, positioned on the roof of an automobile and performs the function of receiving DAB transmissions.

The description will now be continued with reference once more to FIG. 15.

The receiver unit 203 has operating keys (not shown in the diagram), by operation of which a reception channel is selected and desired transmissions from the satellite broadcast and VHF broadcast signals supplied from the antenna unit 201 via the cable 202 are demodulated and audio signals reproduced. Additionally, the receiver unit 203 supplies a direct-current bias to the cable 202 and via the cable 202 supplies drive power to the antenna unit 203. An AC-DC separator circuit that separates the alternating-current component and the direct-current component of the signals on the cable 202 is mounted on the circuit substrate 209 of the antenna unit 201, and is configured so that, at the circuit substrate 209, the direct-current bias supplied to the cable 202 from the receiver unit 203 is not supplied to the mixer 224.

Additionally, by extracting the direct-current component of the cable 202 the direct-current bias voltage supplied to the cable 202 from the receiver unit 203 is extracted as the circuit substrate 209 drive voltage.

As described above, by arranging the satellite broadcast reception antenna element 207 and the VHF broadcast reception antenna element 208 inside a single casing 211, the antenna unit 201 of the present embodiment forms a single antenna unit from the separate reception antenna elements 207, 208.

Accordingly, by integrating into a single unit the satellite broadcast reception antenna element 207 and the VHF broadcast reception antenna element 208 as described above, both satellite broadcast and VHF broadcast DAB can be enjoyed and at the same time the process of manufacturing said unit can be simplified as compared to the conventional process, whereby the respective satellite broadcast reception antenna element and the VHF broadcast reception antenna element are produced separately.

Additionally, with respect to the DAB, even when receiving both satellite broadcast signals and VHF broadcast signals, it is sufficient to mount the antenna unit 2 and so a single mounting operation is sufficient, making it possible to simplify assembly.

It should be noted that, although in the present embodiment dielectric ceramics are used as the material from which is made the dielectric substrate comprising the planar antenna element 10, it is also possible to use a PPO (polyphenylene oxide) material instead of the dielectric ceramics. However, the PPO material requires punching and cutting operations be performed when forming the substrate and thus its formation is not easy. Therefore the present embodiment uses easily formable dielectric ceramics as the material for the dielectric substrate of the planar antenna unit 206.

By together forming the satellite broadcast reception antenna element 207 and the VHF broadcast reception antenna element 208 on a single planar antenna element 206 as described above, the need for preparing a circuit substrate for each antenna element 207, 208 is eliminated.

Accordingly, the number of component parts in the antenna unit 201 can be reduced and the antenna unit 201 can be made more compact.

Additionally, by giving the satellite broadcast reception antenna element 207 and the VHF broadcast reception antenna element 208 a planar antenna structure as in the present embodiment, the antenna element can be made slimmer and, accordingly, the antenna unit 201 can be made smaller.

Additionally, there is only one cable 202 drawn from the antenna unit 201 and, thus, only one connector is needed to connect the cable 202 to the receiver unit 201. Accordingly, the number of component parts of the present embodiment can be reduced. Moreover, costs can be reduced and at the same time assembly can be simplified.

It should be noted that although the present embodiment gives both the satellite broadcast reception antenna element 207 and the VHF broadcast reception antenna element 208 a planar antenna structure and arranges both on the same dielectric substrate 215, the present invention is not limited to such an embodiment. Rather, it is sufficient that satellite broadcast reception antenna element 207 and VHF broadcast reception antenna element 208 are integratably mounted as a single unit. Moreover, the VHF broadcast reception antenna element 207 may be a helical antenna.

Further, although in the present embodiment the antenna unit 201 receives DAB transmissions it is possible to receive satellite transmissions and thus it is also possible to receive GPS (Global Positioning System) data. In addition, it is even possible to receive both DAB transmissions and GPS data.

What is claimed is:

1. An antenna unit comprising within a single casing a first planar antenna element for receiving left-handed polarized waves formed as a planar antenna structure and a second planar antenna element for receiving right-handed polarized waves formed as a planar structure on the same antenna element substrate as the first planar antenna element;
   a first low-noise amplifier circuit for amplifying left-handed polarized waves received by the first planar antenna element;
   a second low-noise amplifier circuit for amplifying right-handed polarized waves received by the second planar antenna element; and
   a switching circuit for detecting a voltage of an output terminal and selectively outputting one of either an output signal from the first low-noise amplifier circuit or an output signal from the second low-noise amplifier circuit by controlling a drive power for driving the first low-noise amplifier circuit as well as the second low-noise amplifier circuit in response to an output terminal detection result and wherein the first low-noise amplifier circuit, the second low-noise amplifier circuit and the switching circuit are all mounted on a single substrate the switching circuit having:
   a first stabilized power circuit for stabilizing a voltage supplied from the output terminal to the first low-noise amplifier circuit;
   a second stabilized power circuit for stabilizing a voltage supplied from the output terminal to the second low-noise amplifier circuit; and
   switching control means for controlling the drive voltage supplied to the first low-noise amplifier circuit and the second low-noise amplifier circuit from the first stabilized power circuit and the second stabilized power circuit in response to the output terminal voltage.

2. An antenna unit comprising within a single casing a first planar antenna element for receiving left-handed polarized waves formed as a planar antenna structure and a second planar antenna element for receiving right-handed polarized waves formed as a planar structure on the same antenna element substrate as the first planar antenna element;
   a first low-noise amplifier circuit for amplifying left-handed polarized waves received by the first planar antenna element;
   a second low-noise amplifier circuit for amplifying right-handed polarized waves received by the second planar antenna element; and
   a switching circuit for detecting a voltage of an output terminal and selectively outputting one of either an output signal from the first low-noise amplifier circuit or an output signal from the second low-noise amplifier circuit by controlling a drive power for driving the first low-noise amplifier circuit as well as the second low-noise amplifier circuit in response to an output terminal detection result and wherein the first low-noise amplifier circuit, the second low-noise amplifier circuit and the switching circuit are all mounted on a single substrate, and wherein on one surface of the substrate are mounted the first low-noise amplifier circuit, the second low-noise amplifier circuit and the switching circuit, and having a shield casing for shielding the surface of the substrate on which are mounted the first low-noise amplifier circuit, the second low-noise amplifier circuit and the switching circuit, the switching circuit having:
   a first stabilized power circuit for stabilizing a voltage supplied from the output terminal to the first low-noise amplifier circuit;
   a second stabilized power circuit for stabilizing a voltage supplied from the output terminal to the second low-noise amplifier circuit; and
   switching control means for controlling the drive voltage supplied to the first low-noise amplifier circuit and the second low-noise amplifier circuit from the first stabilized power circuit and the second stabilized power circuit in response to the output terminal voltage.

3. The antenna unit as claimed in claim 2 wherein, the first antenna element and the second antenna element are mounted on another surface of the substrate.

4. A signal switching circuit for selecting and outputting from an output terminal thereof one input signal from among input signals input to a plurality of input terminals, wherein the signal switching circuit comprises:
   voltage detection means for detecting any voltage at the output terminal and developing a drive voltage therefrom;
   a plurality of signal amplifying means for amplifying input signals applied thereto, each of the signal amplifying means being respectively connected between one of the plurality of input terminals and the output terminal and its operation being controlled in response to the drive voltage;
   drive voltage switching means for supplying said drive voltage to one of the plurality of signal amplifying means; and a voltage applied to the output terminal in response to the detection results of the voltage detection means, said voltage detection means being provided between the output terminal and the plurality of signal amplifying means and voltage converting means for converting to a predetermined voltage a voltage supplied as said drive voltage to one of a plurality of signal amplifying means from the output terminal by the drive voltage switching means.

5. A signal switching circuit for selectively outputting an input signal from an output terminal thereof, wherein the signal switching circuit comprises:

an amplifier circuit for amplifying the input signal and supplying it to the output terminal;

a constant voltage circuit for generating a constant voltage from a direct-current voltage applied to the output terminal and supplying that constant voltage to the amplifier circuit;

switching means for switching the constant voltage generated at the constant voltage circuit to the amplifier circuit in response to a voltage applied to a control terminal;

and control means for controlling the constant voltage supplied to the amplifier circuit in response to the direct-current voltage level applied to the output terminal by controlling the voltage supplied to the switching means control terminal in response to a direct-current voltage applied to the output terminal.

6. A signal switching circuit for selectively outputting a first and second input signal from an output terminal thereof, wherein the signal switching circuit comprises:

a first amplifier circuit for amplifying a first input signal;

a second amplifier circuit for amplifying a second input signal;

a first drive voltage generating means for generating a constant voltage from direct-current voltage applied to the output terminal and supplying it to the first amplifier circuit;

a second drive voltage generating means for generating a constant voltage from direct-current voltage applied to the output terminal and supplying it to the second amplifier circuit;

a first control means for controlling a first drive voltage control means so as to apply the constant voltage generated at the first drive voltage generating means to the first amplifier circuit when the direct-current voltage level applied to the output terminal is a first direct-current voltage level and to terminate applying the constant voltage to the first amplifier circuit when the direct-current voltage level is a second direct-current voltage level; and a second control means for controlling a second drive voltage control means so as to apply the constant voltage generated at the second drive voltage generating means to the second amplifier circuit when the direct-current voltage level applied to the output terminal is a second direct-current voltage level and to terminate applying the constant voltage to the second amplifier circuit when the direct-current voltage level is a first direct-current voltage level.

7. The signal switching circuit as claimed in claim 6, wherein said first and second drive voltage generating means have first and second control terminals, respectively and wherein the first and second drive voltage control means comprise:

first and second constant voltage circuits for generating a constant voltage from the first and second direct-current voltages applied to the output terminal and supplying it to the first and second amplifier circuits; and switching means for switching the application of the constant voltage generated at the constant voltage circuit to the amplifier circuits in response to the voltage applied to the respective control terminal, the first and second control means having first and second control circuits for controlling a voltage supplied to the control terminals of the first and second drive voltage generating circuits in response to the first and second direct-current voltages applied to the output terminal.

8. The signal switching circuit as claimed in claim 7, wherein the first control circuit has a resistor that turns the level of the control terminal of the first constant voltage circuit to ON when the direct-current voltage of the output terminal is a first direct-current voltage level and that turns the level of the control terminal of the first constant voltage circuit to OFF when the direct-current voltage of the output terminal is a second direct-current voltage; and the second control circuit having an inverter circuit that inverts the first direct-current voltage level and turns the level of the control terminal of the second constant voltage circuit to OFF when direct-current voltage of the output terminal is a first direct-current voltage level and that inverts the second direct-current voltage level and turns the level of the control terminal of the second constant voltage circuit to ON when the direct-current voltage of the output terminal is a second direct-current voltage level.

* * * * *